(12) United States Patent
Strong et al.

(10) Patent No.: US 11,040,737 B2
(45) Date of Patent: Jun. 22, 2021

(54) GUIDANCE AND LIMITING UNIT SUBASSEMBLY FOR A STEERING COLUMN ASSEMBLY

(71) Applicant: NSK Americas, Inc., Ann Arbor, MI (US)

(72) Inventors: Scott Lewis Strong, Manchester, MI (US); Victor Corona Martinez, Ann Arbor, MI (US); Jun Yamada, Maebashi (JP); Dale E. Estes, Pinckney, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 205 days.

(21) Appl. No.: 15/999,376

(22) PCT Filed: Feb. 16, 2017

(86) PCT No.: PCT/US2017/018038
§ 371 (c)(1),
(2) Date: Aug. 16, 2018

(87) PCT Pub. No.: WO2017/142982
PCT Pub. Date: Aug. 24, 2017

(65) Prior Publication Data
US 2020/0331514 A1 Oct. 22, 2020

Related U.S. Application Data

(60) Provisional application No. 62/297,299, filed on Feb. 19, 2016.

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC ........ B62D 1/184; B62D 1/185; B62D 1/187; B62D 1/189
See application file for complete search history.

(56) References Cited

U.S. PATENT DOCUMENTS 5,562,307 A * 10/1996 Connor .................. B62D 1/195
188/371
7,401,813 B2 * 7/2008 Sawada .................. B62D 1/184
280/775
(Continued)

FOREIGN PATENT DOCUMENTS

DE 102014200933 A1 8/2014
DE 102013109931 A1 3/2015
(Continued)

OTHER PUBLICATIONS

Search Report and Written Opinion for International Application No. PCT/US2017/018038; dated May 22, 2017.

*Primary Examiner* — Laura Freedman
(74) *Attorney, Agent, or Firm* — The Dobrusin Law Firm, P.C.

(57) ABSTRACT

A device for assembling a column tube (30) in an adjustable steering column assembly (20), comprising a spacer portion (70) adapted to provide rotational damping; provide damping during adjustment of the steering column assembly (e.g., telescope adjustment); and assist in centering the column tube when in an unlocked position and assist in resisting lash, The device further comprises a stop bracket portion (50) adapted to limit rotational travel of the column tube when in an unlocked position; and retain the column tube longitudinally within the steering column assembly.

20 Claims, 11 Drawing Sheets

(56) References Cited

U.S. PATENT DOCUMENTS

| | | | | |
|---|---|---|---|---|
| 8,550,497 B2* | 10/2013 | Takezawa | ............... | B62D 1/184 |
| | | | | 280/775 |
| 8,590,933 B2* | 11/2013 | Narita | ..................... | F16F 7/123 |
| | | | | 280/777 |
| 9,187,116 B2* | 11/2015 | Yokota | .................... | B62D 1/195 |
| 9,540,031 B2* | 1/2017 | Tagaya | .................... | B62D 1/184 |
| 9,540,034 B2* | 1/2017 | Takahashi | ............... | B62D 1/184 |
| 9,545,943 B2* | 1/2017 | Sakuda | .................. | B62D 1/192 |
| 9,586,611 B2* | 3/2017 | Sakuda | ................... | B62D 1/18 |
| 9,637,159 B2* | 5/2017 | Johta | ..................... | B62D 1/187 |
| 9,663,134 B2* | 5/2017 | Imagaki | ................. | B62D 1/184 |
| 9,738,303 B2* | 8/2017 | Blattler | ................. | B62D 1/185 |
| 9,834,245 B2* | 12/2017 | Orihara | ................. | B62D 1/184 |
| 9,849,906 B2* | 12/2017 | Uesaka | .................. | B62D 1/195 |
| 10,053,134 B2* | 8/2018 | Sakuda | .................. | B62D 1/195 |
| 10,093,341 B2* | 10/2018 | Johta | .................... | B62D 1/192 |
| 10,173,714 B2* | 1/2019 | Nagatani | ............... | B62D 1/184 |
| 10,220,872 B2* | 3/2019 | Yoshihara | .............. | B62D 1/195 |
| 10,259,486 B2* | 4/2019 | Sugiura | .................. | B62D 1/184 |
| 10,377,408 B2* | 8/2019 | Strong | ................... | B62D 1/192 |
| 10,486,731 B2* | 11/2019 | Ishikawa | ................ | B62D 1/185 |
| 10,654,514 B2* | 5/2020 | Shiroishi | ................ | B62D 1/187 |
| 2006/0048597 A1* | 3/2006 | Heiml | ...................... | B62D 1/16 |
| | | | | 74/492 |
| 2007/0137377 A1* | 6/2007 | Kamei | ................... | B62D 1/195 |
| | | | | 74/493 |
| 2012/0085194 A1 | 4/2012 | Inoue | | |
| 2014/0026707 A1 | 1/2014 | Yokota et al. | | |
| 2016/0159387 A1* | 6/2016 | Okano | ................... | B62D 1/184 |
| | | | | 74/493 |
| 2020/0180676 A1* | 6/2020 | Kwon | .................... | B62D 1/184 |

FOREIGN PATENT DOCUMENTS

| | | | |
|---|---|---|---|
| JP | 2009-107506 A | | 5/2009 |
| JP | 2017001622 A | * | 1/2017 |

* cited by examiner

GUIDANCE AND LIMITING UNIT SUBASSEMBLY FOR A STEERING COLUMN ASSEMBLY

FIELD

In general, the present teachings relate to a device for assembling an adjustable steering column assembly. More particularly, the present teachings are directed to a guidance and limiting unit subassembly for providing damping properties and retaining a column tube within the adjustable steering column assembly.

BACKGROUND

In the field of automotive vehicles it has become popular to employ steering column assemblies that include the ability to adjust the assemblies, such as by performing tilt and/or telescoping functions, such assemblies being known also as "rake and reach steering column assemblies." For many applications, steering column assemblies incorporate both tilt and telescopic functions. For these, it is possible to use a manual user operating device (e.g., a lever) or to employ motors to perform one or both of the functions. For example, one lever or motor may be operated to actuate the steering column assembly generally in an upward or downward vertical direction to adjust the height of a steering wheel relative to an operator of the vehicle, relative to the vehicle floor and/or vehicle ceiling, or both and thus perform the tilt function. Another lever or motor may be operated to actuate the steering column assembly to adjust the fore/aft position of the steering wheel relative to the vehicle operator. The latter typically achieves the adjustment by way of translation of a telescopic tubing arrangement by which at least one tube associated with the steering wheel translates relative to a shaft for steering. Industry is constantly seeking to improve these adjustment functions, such as by making the adjustment easier and/or smoother for the vehicle occupant. For example, it is desirable to have a smooth adjustment, such as a "soft stop" while performing the telescoping in and/or telescoping out functions.

Despite the desire for the ability to adjust the steering column assembly, such as based on preferences of the vehicle occupant, there is limited space within the steering column assembly and within the vehicle to accommodate the elements needed to perform these adjustment functions. In vehicle assemblies, there may also be a need to attach additional elements, such as an interface bracket (e.g., a wire harness bracket), to the steering column assembly, e.g., at the column tube. However, there is a limited amount of exposed surface of the column tube for which to attach an interface bracket or other element of the assembly. Therefore, industry is constantly seeking ways to improve the construction of steering column assemblies while reducing the amount of space needed or accommodating all of the desired elements of the assembly within the space available.

With the ability to perform adjustment of the assembly, such as by performing tilt and/or telescoping functions, this also increases the likelihood of creating additional noises, vibrations and harshness detectable by a vehicle occupant. Therefore, there is a need to reduce the metal-to-metal contact between elements of the assembly, especially during adjustment. There is also a need to dampen noise to reduce any undesirable sounds that are detectable by a vehicle occupant and a need to provide a smooth transition while adjusting the assembly.

SUMMARY

The present teachings make use of a simple, yet elegant, construction approach by which relatively few components can be employed for achieving damping within a steering column assembly, and for centering and/or retaining a column tube within a steering column assembly.

In general, the present teachings make use of a device for assembling a column tube in an adjustable steering column assembly. The device may be adapted for use within an internally collapsing steering column assembly. The device may include a spacer portion. The device may include a stop bracket portion. The spacer portion may be adapted to provide rotational damping. The spacer portion may be adapted to provide damping during adjustment of the steering column assembly (e.g., during telescope adjustment of the steering wheel in a fore or aft position). The spacer portion may be adapted to assist in centering the column tube within the column assembly, such as when the column tube is in an unlocked or adjustment positon. The spacer portion may be adapted to resist or reduce lash or remove completely (where lash may be defined as the existence of clearance between two objects) between the device and elements of the steering column assembly, such as the column housing. The lash between at least part of the spacer portion and the column housing may be about 0.1 mm or less. At least a portion of the spacer portion may maintain contact with at least a portion of the column housing (e.g., one or more walls defining the axial slot of the column housing). The stop bracket portion may be adapted to limit rotational travel of the column tube, such as when in an unlocked or adjustment position. The stop bracket portion may retain the column tube longitudinally within the steering column assembly (e.g., by resisting pull out of the column tube from the steering column assembly assembly). The stop bracket portion and the spacer portion may be fabricated individually from each other and may be joined together in an assembly. The stop bracket portion and the spacer portion may be formed from a single piece.

The spacer portion may include one or more resilient portions. A resilient portion may be of a sufficient elasticity that it will return to its original shape and size (or the shape and/or size as prior to deformation) upon release of the compressive forces of the system (e.g., when in an unclamped position). The one or more resilient portions may retain a state of contact with the steering column assembly. At least a portion of the spacer portion (e.g., a resilient portion) may retain a state of contact with a wall defining the axial slot of the column housing. The resilient portion may be configured to at least partially fit within the axial slot of the column housing of the steering column assembly. The resilient portion of the spacer portion may be defined by at least one wing damper. For example, the resilient portion of the spacer may include two wing dampers, with one wing damper each located on opposing sides of the spacer portion. At least a portion of the spacer portion may be in substantial compliance with the column housing of the steering column assembly. The spacer portion may be a molded polymeric part, a metal part, an overmolded part, or a combination thereof. The damping during adjustment of the steering column assembly may be performed by a forward facing or rearward facing resilient tab of the spacer portion. The spacer portion may include a rearward facing tongue portion extending therefrom and wherein the tongue portion includes a slot adapted for receiving at least a portion of the steering column assembly (e.g., a hook associated with a lever of the adjustment subassembly) during telescope adjustment of the steering column assembly, and wherein the slot terminates at one end at a contact portion of the tongue portion. The steering column assembly may include an adjustment subassembly for permitting adjustment of the steering column assembly, and wherein the adjustment subassembly includes a lever for putting the column tube in the unlocked position and actuating the adjustment. The lever may include a hook extending therefrom adapted to be received within the slot of the tongue portion. The lever may include a first arm and a second arm joined by a bridge. The first arm may extend from a pivot point of the lever. The pivot point may be formed by a connection between an elongated fastener (e.g., a tilt bolt) of the adjustment subassembly and the lever. The second arm may include an opposing securing portion that attaches to and/or rotates about an opposing end of the elongated fastener (e.g., the tilt bolt). The hook may be supported by and/or extend from the bridge. During telescope-in (or telescope-out) adjustment of the column tube of the steering column assembly, the hook may contact the contact portion to stop the column tube from telescoping further in a forward direction.

The stop bracket portion may include an attachment area for connecting with the spacer portion. The attachment area may include one or more support posts for matingly receiving the spacer portion by way of through openings (e.g., support post openings) in the spacer portion. The stop bracket portion may include a plurality of support posts. One or more of the support posts may include one or more features that create an interference fit with the spacer portion (e.g., one or more ribs, one or more shaped portions, one or more beads, or the like). The stop bracket portion may include a bracket attachment portion for matingly engaging at least a portion of the column tube of the steering column assembly. The stop bracket portion may include a surface adapted to provide one or more lines (e.g., two or more parallel lines) of contact with the column tube to resist rocking when loaded in torsion (e.g., by radiused edges). The stop bracket portion may include one or more (or preferably a plurality of) attachment apertures for receiving a fastener to secure the stop bracket portion to the column tube. The attachment apertures may receive a fastener such as a rivet (e.g., a steel rivet installed via a break stem fastener) to secure the stop bracket portion to the column tube. The stop bracket portion may include a substantially flat surface surrounding one or more of the attachment apertures for contacting the heads of the fasteners such as rivets (e.g., to reduce the likelihood of the rivets loosening). The stop bracket portion may include a pair of opposing side wall portions adapted to fit within the axial slot of the column housing. The opposing side walls may assist to guide longitudinal adjustment of the column tube of the steering column assembly. The stop bracket portion may include a securing tab adapted for resisting removal of the stop bracket portion and the spacer portion from the column tube. The securing tab may penetrate an opening in the column tube, which may allow for resting pull-out and rotation. The stop bracket portion and the column tube may be joined together in a manner that can withstand a torque of at least about 100 Nm. The device may further include an interface bracket for interfacing with one or more other components of an automobile assembly (e.g., a steering column assembly, wiring harness, column cover, and the like). The interface bracket may be attached to the stop bracket portion, such as by attachment to one or more of the support posts of the stop bracket portion. It is also contemplated that the device may be free of one or any combination of a nut bracket, a stopper pin, or a slot liner.

The teachings herein also contemplate methods of forming and assembling the device and attaching the device within a steering column assembly. The method may include forming a stop bracket portion; attaching the stop bracket portion to a column tube; and securing a spacer portion on the one or more support posts of the stop bracket portion. The method may further include attaching an interface bracket to the stop bracket portion (e.g., upon one or more of the support posts).

As can be seen, it is believed that by employment of the teachings herein it is possible to achieve rotational damping, damping during adjustment of the steering column assembly, centering of the column tube, resistance to lash, limiting of rotational travel of the column tube when in an adjustment mode, retainer of the column tube longitudinally within the steering column assembly, or any combination thereof.

DETAILED DESCRIPTION

Figure 1:
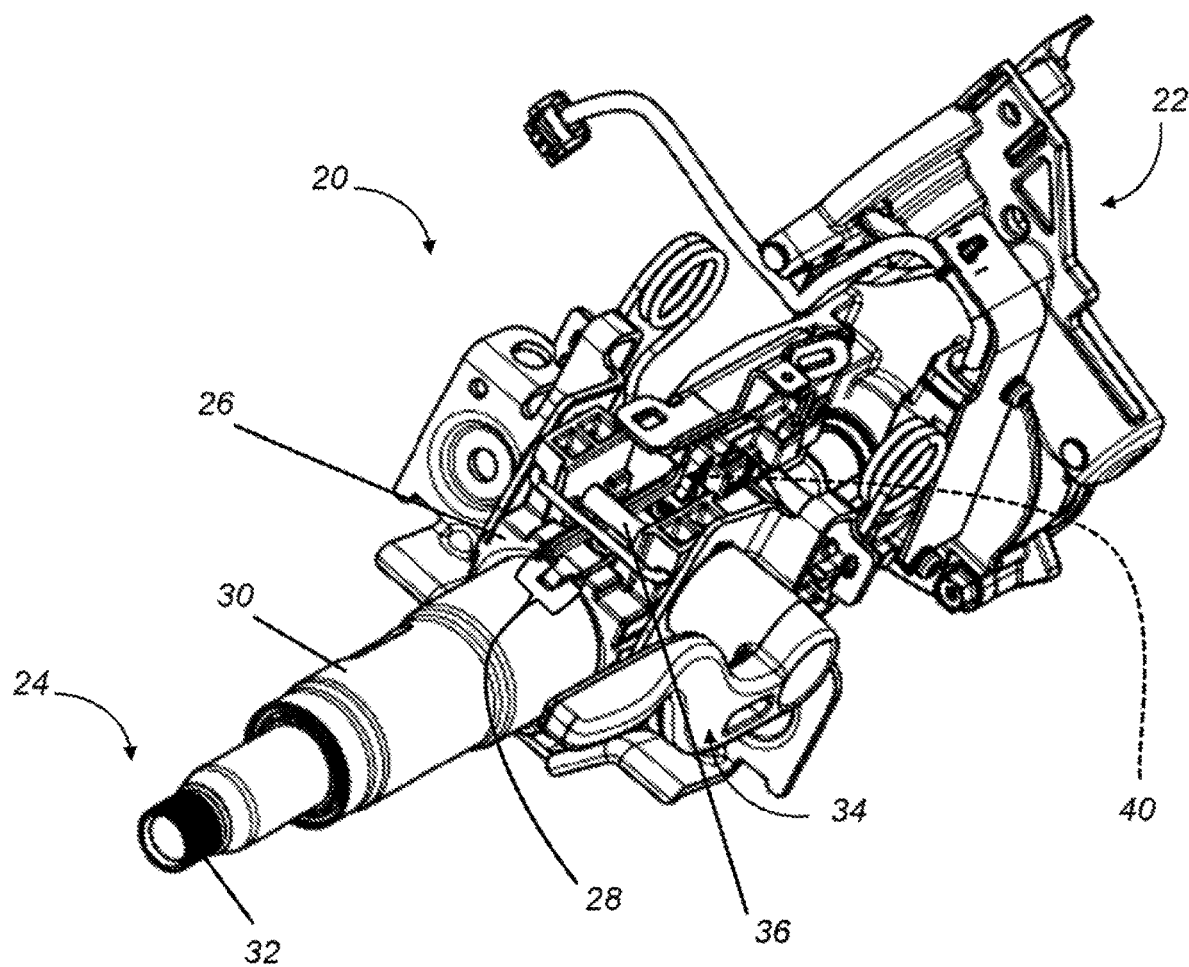
FIG. 1 is a perspective view of an illustrative steering column assembly in accordance with the present teachings and viewed from the bottom.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but, merely as a representative basis for teaching one skilled in the art to variously employ the present teachings.

In general, the teachings herein are directed toward a unique combination of components for assembling a column tube in an adjustable steering column assembly, and more particularly for providing elements such as a spacer portion and a stop bracket portion to retain the column tube within the steering column assembly. By use of the teachings herein, it is possible to (but not limited to) achieve rotational damping, achieve damping during telescope adjustment of at least a portion of the steering column assembly (e.g., the column tube), center the column tube when the steering column assembly is in an unlocked position (e.g., not clamped, during an adjustment of the assembly), resist lash (where lash may be defined as clearance or gaps between parts), limit of rotational travel of the column tube when in an adjustment mode, retain the column tube longitudinally within the steering column (e.g., by resisting pull-out of the column tube from the assembly), or a combination thereof.

With more attention now to the details of the assemblies herein, they generally will include a column tube, a steering shaft, one or more brackets (e.g., a bracket structure for attachment of the steering column assembly in the vehicle, a tilt bracket, an interface bracket, or any combination thereof), a column housing, and a steering wheel adjustment subassembly (e.g., a manually or motor operated steering wheel adjustment subassembly). These elements may be discrete elements or two or more of the elements may be combined into a single unit. The column housing may be operatively connected with a bracket structure. The column housing operatively supports the steering shaft that is driven by a steering wheel. For this purpose, the column housing may itself be a tube. It may also receive another tube that supports the steering shaft. One such tube, referred to herein as the column tube, typically will have a hollow cavity along at least a portion of (if not the entirety of) the length of the tube and may be sized and configured to receive and support a rotatable shaft, namely a steering shaft and possibly one or more bearings. Both the steering shaft and any tube (be it a column housing, a column tube, or both) will have a longitudinal axis. When installed in a vehicle, the longitudinal axis of each the shaft and any tube may be generally coaxially aligned, aligned generally parallel with a longitudinal axis of a vehicle (e.g., within about 10° or even about 5°), or each. The longitudinal axis of each of the shaft and any tube may form an angle with the longitudinal axis of a vehicle of about 45° or less, about 30° or less, or about 25° or less. The steering shaft, the column housing and any column tube typically will be made of a suitable metal, such as steel or aluminum. Metal components herein may also be made of other metals, such as magnesium. Such metals typically will be alloys. However, generally pure metals are also possible. The steering wheel adjustment subassembly may include a lever (or any other user operating device) adapted for actuating (e.g., manually actuating) the subassembly, and at least one engagement member that is brought into and out of engagement with the column tube for selectively locking the steering shaft into a position desired by a user. A lever may include a hook or other projection that engages with another portion of the steering column assembly (e.g., the spacer portion). A mounting structure may detachably mount the steering wheel adjustment subassembly relative to the bracket (e.g., tilt bracket).

A bracket structure may be employed for receiving and/or supporting at least a portion of the steering shaft (e.g., while the shaft is at least partially contained within the column tube, the column housing, or both) and for mounting the steering column assembly within the automotive vehicle. The bracket structure may include a portion, such as an upper plate portion, that is adapted to mount to a vehicle structure (e.g., a cross vehicle beam, an instrument panel, or otherwise) or multiple portions adapted to mount to a vehicle structure. The bracket structure may include a portion that is adapted to support (e.g., pivotally support) a steering shaft (such as by way of a column tube telescopically positioned within a column housing). The bracket structure may be fabricated to include multiple structures, a single unitary structure, or a plurality of components assembled together in an assembly to define a desired bracket structure. The bracket structure may be a cast structure (e.g., structure made by casting a mass), a forged structure (e.g., a structure made by forging a metal mass), a machined structure, a consolidated structure (e.g., a structure made by a step of sintering and/or pressing a powder metal mass), or any combination thereof. One preferred approach is to cast the bracket structure to form a metal casting (e.g., an aluminum alloy, magnesium alloy, or a ferrous metal casting). The bracket structure thus may be configured for integrating functions of mounting within a vehicle and accommodating a tilt function of the assembly relative to a vehicle operator. For instance, the functions may be integrated into a single bracket, or spread among separate bracket components.

As mentioned, the steering column assembly of the present teachings may include one or more steering wheel adjustment subassemblies. For example, an adjustment subassembly may provide a user with the ability to adjust the steering wheel (and thereby the steering shaft) in a fore and/or aft direction (e.g., telescopic adjustment). An adjustment subassembly may provide a user with the ability to adjust the position by raising and lowering the steering wheel, and thereby the steering shaft (e.g., tilt adjustment), relative to the user. The steering column assembly may provide the ability to perform either or both of these functions (e.g., telescopic adjustment and/or tilt adjustment). These functions may be accomplished by one adjustment subassembly or more than one adjustment subassembly (e.g., one adjustment subassembly for providing telescopic adjustment and one adjustment subassembly for providing tilt adjustment).

An adjustable telescoping subassembly may be employed for selectively driving the steering shaft in a fore and/or aft direction generally along the longitudinal axis of the steering shaft. In general, the adjustment of the telescoping subassembly may be controlled by a suitable user operating device (e.g., a lever, an electromechanical actuator, or otherwise). For a manually operated system, a lever or other user operating device may be adapted to control a force applied to maintain the collapsing portion in a user selected position. For example, a lever or other user operating device may be in operative engagement with one, two, or more clamping portions or other suitable mechanism to releasably (and possibly adjustably as well) secure two or more components of the collapsing portion together. Clamping or other securing may be realized by a suitable securing member (e.g., an elongated force applying member), such as a bolt (e.g., a tilt bolt), rod, strap, bar, band, wedge, or other suitable member. For instance, the securing member may be adapted, upon actuation of the user operating device to cause generally opposing portions (e.g., clamping portions) to separate or come closer together such as, respectively, for releasing the components relative to each other or for securing the components relative to each other.

In the alternative, the teachings may include employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears. It may drive the drive member by way of a threaded nut. The motor shaft may have a longitudinal axis that is oriented generally parallel with the longitudinal axis of the steering shaft and/or inner tube. The motor shaft may have a longitudinal axis that is oriented generally transverse with the longitudinal axis of the steering shaft and/or inner tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of or be operably connected with the column housing. Such flat surfaces may be a part of a mounting structure for securing the telescoping motor subassembly to the overall assembly.

The teachings may further contemplate employing at least one tilt subassembly that is adapted for selectively raising or lowering the steering shaft. The optional tilt subassembly may be manually actuated, motorized or both. It may be attached (e.g., at a first mount location along its length) to the bracket structure. For example, as discussed, it may be incorporated within a housing structure (e.g., a column housing) defined in the bracket structure. It may be attached at a second location along its length (e.g., at a second mount location that is distal from the upper surface of the bracket structure as compared with the first mount location).

As indicated, a column housing may be pivotally coupled with the bracket structure (e.g., at a forward end of both the bracket structure and the column housing) and is adapted to permit steering shaft adjustment (e.g., tilt adjustment, telescopic adjustment or both, such as by way of the tilt subassembly, telescoping subassembly, or both). The column housing may be a cast structure (e.g., a structure made by casting a mass), a forged structure (e.g., a structure made by forging a metal mass), a machined structure, a consolidated structure (e.g., a structure made by a step of sintering and/or pressing a powder metal mass) or any combination thereof. One preferred approach is to cast the column housing to form an aluminum alloy casting. The column housing may include one or more ribs. The column housing may be generally elongated. It may have a substantially cylindrical configuration. The column housing may have a portion that is capable of receiving a substantially cylindrical part, such as a column tube. The column housing may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots, in a lower portion for exposing the column tube so that the column tube can be connected with and translate longitudinally (e.g., associated with the telescoping subassembly).

The column housing may be in clamping relation with the column tube so as to permit steering shaft adjustment (e.g., telescoping, tilt, or both). For example, the column housing may be unclamped during adjustment of the steering shaft and/or column tube. The column tube may be clamped when the steering shaft and/or column tube are in the desired position. The column housing, a bracket structure, and/or the column tube may include a structure adapted for clamping the column tube into position (e.g., via a lever or other user operating device). The column housing may at least partially surround the column tube in a relation that may be adapted for clamping or unclamping with the column tube (e.g., when the lever or other user operating device is in a predetermined position) so as to permit steering shaft tilt adjustment, telescoping adjustment, or both. The column housing may include a suitable structure for releasably clamping or otherwise engaging the column tube into position. For example, the column housing may include an elongated longitudinally oriented opening (e.g., an axial slot) that defines an inner surface structure that may include opposing inner surfaces (e.g., wall surfaces) that can be urged toward the column tube for clamping the column tube into position (e.g., by using the lever to apply a clamping force, such as by way of a tilt bracket).

The position of the column tube relative to the column housing may be fixed by way of a securing member that is located in a secure engagement position and applies a force (e.g., a generally transverse force relative to the longitudinal axes of the column tube and the column housing) to at least one of the column housing or column tube for causing a secure engagement of the column tube and the column housing (e.g. a clamped engagement, an interference, interlock, detent, or other mechanical engagement). The securing members may cause a portion of the column housing (e.g., inner walls of the column housing) to clamp onto the outer diameter column tube, thereby securing the column tube in a desired position (e.g., a desired telescope position, tilt position, or both). Securing members may include an elongated force applying member, such as a bolt (e.g., a tilt bolt), rod, strap, bar, band, wedge, or other suitable member. For example, the securing member may be adapted, upon actuation of the lever or other user operating device to cause generally opposing portions (e.g., clamping portions) to separate or come closer together, respectively, such as for releasing components relative to each other or for securing the components relative to each other. When in an unclamped and/or unlocked position, the width of the axial slot of the column housing may change (e.g., a wider slot when unlocked to permit adjustment; a narrower slot when locked to hold the column tube in proper position).

The present teachings contemplate a guidance and limiting unit subassembly associated with the steering column assembly (e.g., the column tube) to provide stability of the column tube within the steering column assembly, especially within an adjustable steering column assembly. The guidance and limiting unit subassembly may be particularly suited for a collapsible steering column assembly, such as an internally collapsible steering column assembly. At least a portion of the guidance and limiting unit subassembly may be located within the axial slot of the column housing. The guidance and limiting unit subassembly may include one or more resilient elements that have energy absorption characteristics. Resilient may be defined as being of a sufficient elasticity for returning generally to its original shape and/or size (or the shape and/or size prior to deformation) upon release of the compressive forces (e.g., while in an adjustment position, unclamped position, or both). The guidance and limiting unit subassembly may provide an area for attachment of other articles to the steering column assembly (e.g., an interface bracket). The guidance and limiting unit may act as a stop during adjustment of the steering column assembly (e.g., to resist pull-out of the column tube from the steering column assembly). The guidance and limiting unit subassembly may be made of one or more pieces. The guidance and limiting unit subassembly preferably includes a stop bracket portion and a spacer portion to achieve any or a combination of the desired functions. The stop bracket portion and spacer portion may be discrete elements from each other, discrete elements from the column tube, or both. The stop bracket portion and spacer portion may be integrally formed. The stop bracket portion, the spacer portion, or both, may be integrally formed with the column tube.

The stop bracket portion may be positioned on the column tube (i.e., on the outer surface of the column tube). The stop bracket portion of the guidance and limiting unit subassembly may be adapted to be attached to at least a portion of the column tube. The stop bracket portion may instead be integrally formed with the column tube. The stop bracket portion may have a surface that is adapted to provide one or more lines (e.g., two or more parallel lines) of contact with the column tube to resist rocking of the stop bracket portion on the column tube (e.g., when loaded in torsion, such as by radiused edges). At least part of the stop bracket portion may be positioned to extend away from the outer surface of the column tube and fit within the axial slot of the column housing when the steering column assembly is assembled. The stop bracket portion may be adapted to limit the rotational travel of the column tube, especially while in an adjustment mode (e.g., while adjusting telescoping, tilt, or both). The stop bracket portion may function to provide for a rotational stop for the column tube within the steering column assembly (e.g., by engaging with the walls of the column housing defining the axial slot). The stop bracket portion may function to provide support to and/or engage with the spacer portion of the guidance and limiting unit subassembly. The stop bracket portion may function to provide support and/or a connection area for one or more interface brackets, such as a wire harness. The stop bracket portion, alone or in combination with a spacer portion, may function to retain the column tube longitudinally within the steering column assembly and/or provide a stop for a telescoping steering column assembly (e.g., acting as a stop during telescope out to resist pull-out of the column tube from the assembly, acting as a stop during telescope in, or both).

The stop bracket portion may include a body portion for interfacing with and/or attaching to a portion of the steering column assembly, such as the column tube. The body portion may include a column tube attachment portion (e.g., the area where the stop bracket portion interfaces with and/or attaches to the column tube). The body portion, such as at the column tube attachment portion, may include a surface that is to be in contact with the column tube (e.g., one or more lines of contact, or multiple parallel lines of contact, which may preferably be two lines of contact) to resist rocking when loaded in torsion (e.g., by radiused edges). The body portion (e.g., at the column tube attachment portion) may include one or more openings for receiving a fastener (e.g., one or more rivets); one or more integrated fasteners, such as clips or snaps; or one or more surfaces for otherwise attaching the body portion to the column tube (e.g., via adhesives, welding, soldering, clinching, or other methods). The cross-section of the body portion (e.g., taken along a transverse axis) may be generally planar, may be generally arcuate, may have one or more angles, may generally match the shape or follow the contours of the column tube upon which it will be secured, or a combination thereof. The body portion may include segments that are generally planar or flat. The body portion may include one or more segments that are generally curved, arcuate or angled. The body portion may include radiused edges for reducing or resisting rocking of the stop bracket portion.

The body portion may include one or more side wall portions extending from one or more edges of the body portion. The one or more side wall portions are preferably located on the long edges of the stop bracket portion (e.g., parallel to the longitudinal axis of the column tube, stop bracket portion, or both). The body portion may include opposing side wall portions so that the walls are extending from opposing edges of the body portion. The opposing side wall portions may be adapted to fit within and/or contact the walls of the column housing defining the axial slot of the column housing. When installed, each side wall portion may be about 5 mm or less, about 3 mm or less, or about 2.5 mm or less from the nearest wall defining the axial slot of the column housing. The side wall portions may guide longitudinal adjustment of the column tube (e.g., when there is clearance in the column housing, such as when it is in an adjustment or unclamped mode). The opposing side wall portions and the body portion may form a generally U-shaped cross-section or a W-shaped cross-section (i.e., if the body portion has a curve, arc, angle or contour that is shaped to generally follow the contours of the outer surface of the column tube). The side wall portions may extend along at least a part of an edge of the body portion. Each side wall portions may form an angle with the body portion. The angle may be about 45 degrees or more, about 65 degrees or more, or about 80 degrees or more. The angle may be about 135 degrees or less, about 115 degrees or less, or about 100 degrees or less. The side wall portions may be generally perpendicular to at least a portion of the body portion.

The stop bracket portion may include one or more attachment apertures for securing or attaching the stop bracket portion to the steering column assembly (e.g., the column tube). For example, the body portion may include three or more attachment apertures. The attachment apertures may be arranged in any configuration that allows for secure attachment of the stop bracket portion to the column tube. For example, the attachment apertures may be arranged in a generally linear orientation (e.g., along or parallel to the longitudinal axis of the stop bracket portion, the column tube, or both). The stop bracket portion may preferably include a plurality of attachment apertures (e.g., two or more, three or more, four or more). Each aperture may be adapted for receiving a fastening means, such as a rivet (e.g., via break stem fastener), screw, bolt, pin, or the like. The column tube of the steering column assembly may include corresponding openings for receiving the fastener or other attachment means (e.g., a rivet joining the stop bracket portion to the column tube).

The attachment apertures may include a flattened portion, or an embossment, that surrounds one or more of the attachment apertures. The embossment may provide support to the fastener (such as the top of the rivet). The embossment may provide a platform for the fastener (e.g., a rivet) to engage with, which may reduce the risk of the fastener loosening, reduce the risk of the stop bracket portion disengaging from the column tube, or both. For example, the embossment may create a rivet pad in the body portion of the stop bracket portion, which is a small flat area for each rivet. In doing so, the rivet may be less likely to flex under a torsional load applied to the column tube, which may reduce or prevent loosening of the joint.

The stop bracket portion may include one or more securing tabs that engage with the column tube. The one or more securing tabs may function to assist in preventing disengagement of the stop bracket portion from the column tube. The securing tab may resist rotation of the stop bracket portion on the column tube. The securing tab may assist in resisting rotation of the column tube within the steering column assembly (e.g., during adjustment of the steering column assembly). The securing tab may resist pullout of the stop bracket portion from the column tube. The securing tab may reduce the ability of the column tube to rotate within the column housing (e.g., rotation of about 45 degrees or less, about 20 degrees or less, or even about 10 degrees or less), especially during adjustment of the steering column assembly. The securing tab may serve as a backup attachment method (e.g., if the other attachment methods no longer completely attach the stop bracket portion to the column tube, such as if the fasteners were not installed or upon loosening or failure of the fasteners securing the stop bracket portion to the column tube). Within the assembly, the stop bracket portion may be located between the tilt bolt and the column tube. With the stop bracket portion, in essence, being sandwiched or held between the tilt bolt and the column tube, this may force the securing tab to remain engaged with the column tube. The position of the stop bracket portion within the assembly, along with the engagement of the securing tab, may assist in keeping the stop bracket portion from sliding along the column tube or out of the intended position. Therefore, even if the attachment of the stop bracket portion fails, the stop bracket portion may remain secure within the assembly and in its intended position. The securing tab may extend from any part of the stop bracket portion and engage with an opening in the column tube. The securing tab preferably extends from a short edge of the stop bracket portion (e.g., an edge generally perpendicular to the edges having one or more side walls or generally along or parallel to a transverse axis of the column tube, stop bracket portion, or both). For example, the securing tab may extend from the rear edge of the body portion of the stop bracket portion. The securing tab may form an angle with the body portion of the stop bracket portion. The securing tab may extend toward the column tube to form an angle (between the securing tab and the side of the body portion that contacts the column tube) of about 35 degrees or more, about 50 degrees or more, or about 80 degrees or more. The securing tab may extend toward the column tube at an angle of about 175 degrees or less, about 150 degrees or less, or about 100 degrees or less. The securing tab may be generally planar. The securing tab may have one or more turns or angles. For example, the securing tab may have a generally right angle or an L shape, with one portion extending outwardly from the body portion and then angling toward and through the opening of the column tube. In another example, the securing tab may form a Z shape, extending outwardly from the body portion, extending toward the column tube and through the opening of the column tube, and then extending away from the body portion to be generally parallel with the column tube to engage with the inner surface of the column tube. In yet another example, the securing tab may form a C shape (or backward C shape), extending outwardly from the body portion, extending toward and through the opening of the column tube, and then extending in the direction back toward the body portion to be generally parallel with the column tube to engage with and/or hook around the wall defining the opening in the column tube.

The stop bracket portion may include one or more support posts extending from the body portion and/or one of the side walls and terminating at a free end. The support posts may be adapted to engage with a spacer portion (e.g., by the free end of each support post extending though an opening in the spacer portion). One or more support posts may be adapted to support an interface bracket (e.g., by attaching the interface bracket to the one or more support posts, for example, at the free end). The support posts may be arranged to extend from an edge of the body portion or a side wall of the stop bracket portion. For example, the one or more support posts may extend from one or both of the long edges of the stop bracket (e.g., the edges parallel to the longitudinal axis of the column tube, stop bracket portion, or both). The stop bracket portion may include a plurality of support posts (e.g., two or more, three or more, four or more). The number of support posts utilized may depend upon the shape of the spacer, the stability required for the stop bracket portion, the number of posts needed to support an interface bracket, or a combination thereof. For example, two support posts may extend from one edge (e.g., long edge) of the stop bracket portion. Two additional support posts may extend from the opposing edge (e.g., the other long edge) of the stop bracket portion (e.g., generally opposing the first two support posts). One support post and its corresponding support post extending from the opposing edge may be generally in line with each other (e.g., generally symmetrical about the longitudinal axis of the stop bracket portion). The support posts may instead be generally staggered (e.g., not in line with each other along a transverse axis of the stop bracket portion).

The support posts may be of sufficient height for engaging with and/or securing a spacer portion. One or more support posts may have a height that is capable of supporting an interface bracket (e.g., of sufficient height so the free end of the support post can extend through an opening in the spacer portion and extend beyond the spacer portion to provide sufficient area for attachment of the interface bracket). Any or all of the support posts may include a bracket attachment portion for securing an interface bracket to one or more of the support posts. The bracket attachment portion is preferably located at or near the free end of one or more support posts. One or more support posts may have one or more openings for receiving a fastener (i.e., for attaching an interface bracket to the support post), which may be located generally at the bracket attachment portion. There may be an embossment or flattened area surrounding the opening for reducing the likelihood of the fastener loosening (e.g., a rivet, bolt, screw, and the like). The greater the number of support posts utilized for supporting an interface bracket, the greater the stiffness imparted to the stop bracket portion, the interface bracket, or both. The support posts may have differing heights. For example, one or more support posts may be longer than other support posts, with the longer posts including a bracket attachment portion, providing the area for attachment of an interface bracket. Some or all of the support posts of the stop bracket portion may generally have the same height. For example, all of the support posts may have the same height. In another example, two support posts may have the same height, and two additional support posts may have the same height as each other but a different height than the first two support posts. Diagonally opposing posts (e.g., posts not directly in line with each other on the same edge or opposing edge) may have the same height (e.g., to stabilize the interface bracket and distribute the weight of and/or any forces exerted on the interface bracket along the support bracket portion). One or more support posts may have one or more features for securing a spacer portion. For example, one or more support posts may have one or more ribs or other projections (e.g., extending inwardly) that engage with one or more walls defining a clearance in the spacer portion. The one or more features of the support posts may assist in providing an interference fit of the spacer portion upon the stop bracket portion.

The stop bracket portion may be formed from any material capable of being attached and secured to a column tube, withstanding any forces exerted upon it (e.g., by the column housing), limiting rotational travel of the column tube when in an adjustment mode, retaining the column tube longitudinally within the steering column assembly (e.g., by resisting pull-out of the column tube from the assembly), or any combination thereof. The material may include metal, such as pure metals or metal alloys, polymers, or any combination thereof.

The stop bracket portion may be formed from one or more pieces that are fastened or attached together, such as by one or more adhesives, screws, bolts, pins, clips, clamps, rivets, or other fasteners, or by methods such as (but not limited to) welding, soldering, crimping, brazing, or molding. The stop bracket portion may be formed from a single piece or sheet of material. For example, the stop bracket portion may be formed from a single metallic sheet. The outline, or perimeter of the stop bracket portion, may be stamped out (such as by a progressive die process or a transfer die process). This stamping may lead to one side of the sheet having generally rounded edges, while the other side of the sheet may have edges with one or more stamping burrs. The side of the sheet having one or more stamping burrs may also include one or more beads that project from the edge (e.g., extending further than the stamping burrs) to allow for easier installation of the spacer portion onto the support posts (i.e., to provide a distance or a pocket between the stamping burrs and the wall of the spacer portion defining the support post opening). The beads may further engage with the spacer portion to provide additional securing of the spacer portion on the stop bracket portion. Embossing or other shaping may be performed for forming the ribs on any or all of the support posts for engaging with a spacer portion. Embossments may be made in the areas of attachment apertures (e.g., for receiving a fastener such as a rivet by a break stem fastener). The attachment apertures may be punched (e.g., in the area where the embossment occurred at the column tube attachment portion, in one or more of the support posts at the bracket attachment portion, or both). These punched apertures may be undersized and used as die pilots. The stop bracket portion may then be folded into a generally U-shaped channel. After folding, the attachment apertures may be pierced to size. It is contemplated that one or more relief cuts may be made in the stop bracket portion (e.g., between two support posts) for easing the folding and/or forming of the stop bracket portion.

This method of formation is only exemplary. It is contemplated that these steps may be performed in any order, and are not limited to the order as exemplarily described herein. It is also contemplated that any of the steps as described herein may be omitted during formation. For example, if methods of attachment for securing the stop bracket portion to the column tube are used that do not require apertures for receiving fasteners (e.g., welding, soldering, bonding, and the like), it may not be necessary to punch and/or pierce attachment apertures into the stop bracket portion. If stamping burrs are not present upon one or more edges of the stop bracket portion, one or more beads may not be needed to form a pocket between the spacer portion and the stamping burrs. The stop bracket portion may be formed via one or more molding and/or overmolding techniques (e.g., if the stop bracket portion is or includes a polymeric material). It is also contemplated that multiple pieces may be used to construct the stop bracket portion. For example, one or more support posts may be attached to the body portion of the stop bracket portion (e.g., via welding, soldering, adhesive, mechanical fastener, or the like).

The guidance and limiting unit subassembly includes a spacer portion. The spacer portion may provide damping characteristics to the subassembly and/or the steering column assembly. The spacer portion may assist in maintaining the position of the column tube within the steering column assembly (especially the column housing) in a longitudinal direction. The spacer portion may center the column tube within the assembly. The spacer portion may prevent or reduce the rotation of the column tube (e.g., during an adjustment of the assembly). The spacer portion may provide support to the one or more support posts (e.g., by holding them in the proper position). The spacer portion may provide a stop for the column tube during telescopic adjustment in a fore or aft direction.

To assemble guidance and limiting unit subassembly, the spacer may be installed upon one or more of the support posts of the stop bracket portion. The spacer portion may include one or more openings for receiving a support post of the stop bracket portion. The spacer portion may include the same number of openings as there are support posts. For example, the spacer portion may include four support post openings, one opening for each support post of the stop bracket portion. The spacer portion may have one or more additional openings or cutouts (e.g., indentations or thinned areas) to allow the spacer portion to fit within the subassembly, to provide flexibility to the spacer, to accommodate one or more damping components, to reduce the weight of the spacer, or a combination thereof. The body of the spacer portion may include one or more walls defining clearances to accommodate the ribs of the support posts of the stop bracket portion. The spacer portion may further include one or more damping components or compression elements that are integrally formed with and/or extend from the body of the spacer portion.

The spacer portion may provide damping characteristics by including one or more damping components or compression elements. The damping components may be one or more compression and/or resilient members extending from the body of the spacer portion to absorb energy, flex, plastically deform, elastically deform, maintain contact with one or more pieces of the steering column assembly (e.g., the column housing) to achieve improved compliance, where compliance is defined as a measure of the ability of a mechanical system to respond to an applied force, expressed as the reciprocal of the system's stiffness; reduce lash, where lash is defined as the existence of a gap or clearance between two parts or objects; or any combination thereof. Resilient may be defined as being of a sufficient elasticity for returning generally to its original shape and/or size (or the shape and/or size prior to deformation) upon release of the compressive forces (e.g., while in an adjustment position, unclamped position, or both). These damping components may function to provide for column rotation compliance, dampening, telescope out compliance, or any combination thereof. The damping components may also provide for a "soft" stop during the telescope out or telescope in of the steering column.

The damping components may include one or more wing dampers. Preferably, the spacer portion includes two or more wing dampers. The wing dampers may be generally resilient to produce a springing effect. The springing effect may allow for the wing dampers to maintain contact (or at least reduce lash) with a portion of the steering column assembly, such as the column housing, even during an adjustment or while in an unclamped position. One or more wing dampers may retain a state of contact with the column housing (e.g., the walls defining the axial slot of the column housing). The one or more wing dampers may at least partially be configured to fit within the axial slot of the column housing. The wing dampers may extend from the spacer portion on opposing sides of the spacer portion to engage with the column housing at the boundaries of the axial slot of the column housing. The wing dampers may extend from the body of the spacer portion and terminate at a free end. The wing dampers may extend at an angle from the body of the spacer portion. The wing dampers may form an angle with the body of the spacer, which may be determined by measuring the gap between the body of the spacer and the wing damper (e.g., the angle measured between a vertical plane along the longitudinal axis of the spacer portion and the wing damper), of about 75 degrees or less, about 60 degrees or less, or about 45 degrees or less. The wing damper may form an angle with the body of the spacer of about 3 degrees or more, about 10 degrees or more, or about 15 degrees or more. The angle may change depending on whether the steering column assembly is in a clamped or unclamped position (e.g., a greater angle when the steering column assembly is in an unclamped position). The wing damper may generally be an elastomeric material or other material capable of absorbing energy and/or deforming upon the application of a force. The wing dampers may be generally planar. The wing dampers may have one or more bends, curves, angles, or arcs that may assist in maintaining contact with one or more elements of the steering column assembly (e.g., the column housing, such as the walls defining the axial slot), providing additional stiffness to the wing dampers, or both. The wing dampers may instead be generally loop shaped, so the material extends from the body of the spacer portion in a generally circular or ovular shape having a hollow center. The loop shape may allow for greater damper stiffness and/or allow for generous lead into the axial slot of the column housing during the assembly process. The engagement of the wing dampers and the column housing may provide a self-centering effect, centering the column tube due to the damping or spring effect of the wing dampers. When located within the steering column assembly, the wing dampers may maintain contact with (or at least remain close to) the column housing, even during adjustment of the steering column assembly (e.g., telescopic adjustment, tilt adjustment, or both) and/or when the column housing is in an unclamped position. It is possible that when the spacer portion is installed within the steering column assembly, the wing dampers may maintain contact with the column housing (e.g., at the one or more walls defining the axial slot of the column housing) at all times. Therefore, spacer portion may have a lash of about 0.1 mm or less, about 0.08 mm or less, or even about 0.05 mm or less. This may reduce or prevent rotation of the column tube within the steering column assembly, particularly during an adjustment of the steering column assembly. The spacer portion may be in substantial compliance with the column housing, where substantial compliance may be within about 0.1 mm (e.g., about 0.1 mm or less, about 0.08 mm or less, or even about 0.05 mm or less).

The damping components may include one or more compression elements such as resilient tabs. A resilient tab may be located on a rearward-facing edge of the spacer portion, a forward-facing edge of the spacer portion, or both. The resilient tab may be integrally formed with the spacer portion. The resilient tab may be connected to (or integrally formed with) the spacer portion at one end, and a free end may project generally outwardly from the spacer portion. The resilient tab may project from the body of the spacer portion at an angle. The resilient tab may form an angle with the body of the spacer, which may be the gap between the body of the spacer and the resilient tab (e.g., the angle measured between a vertical plane along the transverse axis of the spacer portion and the resilient tab), of about 75 degrees or less, about 60 degrees or less, or about 45 degrees or less. The resilient tab may form an angle with the body of the spacer of about 3 degrees or more, about 10 degrees or more, or about 15 degrees or more. The angle may change depending upon the forces exerted upon it (e.g., the angle may become smaller as the resilient tab contacts a tilt bolt of the steering assembly during telescoping out). The resilient tab may generally be an elastomeric material or other material capable of absorbing energy and/or deforming upon the application of a force. The resilient tab may be generally planar. The resilient tab may have one or more arcs, bends, curves, angles (e.g., a series of planar segments to form an angled tab). The resilient tab may curve at its free end. The curved portion of free end may curve toward and may engage with the tilt bolt during a telescope out adjustment of the steering column. The resilient tab may provide damping by providing an area that contacts the tilt bolt of the steering column assembly during a telescope out adjustment (i.e., of the steering shaft, column tube, or both). The resilient tab may elastically deform when it comes into contact with the tilt bolt. The resilient tab may continue to elastically deform as the column tube extends until it comes into contact with the body of the spacer portion. The resilient tab may include one or more stops, small bumps, or projections on the resilient tab facing the body of the spacer portion, which contact the body of the spacer portion as the resilient tab elastically deforms, causing the telescope out adjustment to stop. The stop of the resilient tab may help prevent metal to metal contact between the tilt bolt and other elements of the guidance and limiting unit subassembly, such as the stop bracket portion (e.g., at one or more support posts).

The spacer portion may also include a tongue portion that engages with other elements in the steering column assembly (e.g., a hook of a lever of the adjustment subassembly) to provide a soft telescope-in stop, telescope out stop, or both for the column tube and/or the steering shaft. The tongue portion may extend rearwardly (i.e., toward the rearward end of the steering column assembly) from an end of the spacer portion. The tongue portion may extend from the spacer portion on the same side as a rearward resilient tab of the spacer portion. The tongue portion may be a generally curved element that includes a slot defined by side walls (e.g., generally opposing side walls) for receiving another element of the steering column assembly (e.g., the hook associated with a lever of the adjustment subassembly). The slot may be located on the underside of the tongue portion (i.e. facing downwardly toward the floor or ground within the steering column assembly). The slot may terminate at a contact portion. The contact portion may be a wall that is generally perpendicular to the generally opposing side walls of the tongue portion that define the slot. The surface of the contact portion may be generally planar. The surface of the contact portion may be generally curved and/or arcuate. The surface of the contact portion may include one or more angular portions (e.g., formed by two or more segments joined together). The contact portion may be positioned on an angle within (or to terminate) the slot. For example, a plane extending generally parallel to the contact portion (or a plane extending between the endpoints of the contact portion if curved) may form an angle α with a plane extending across the generally opposing side walls of the tongue portion defining the slot. The angle α may be less than about 180 degrees. The angle α may be about 90 degrees or more, about 110 degrees or more, or about 120 degrees or more. The angle α may be about 170 degrees or less, about 150 degrees or less, or about 140 degrees or less. The contact portion may include a compression member (such as a finger) extending angularly from the surface of the contact portion to serve as a point or line of contact with the hook associated with the lever of the adjustment subassembly and to provide additional damping and energy absorption.

The spacer portion may be constructed of a resilient material, such as a polymeric and/or elastomeric material, though metallic materials are also possible. The spacer portion may be formed by extrusion methods and/or molding methods. The spacer portion may be formed by employing one or more overmolding techniques (e.g., so that two or more materials can be molded together). The spacer portion may be formed by a method free of die slides. For example, the damping components may be made by die cavities kissing off, with the allowance of proper die shut off angles. As noted, the spacer portion may instead be integrally formed with the stop bracket portion. Therefore, the guidance and limiting unit subassembly may be formed by stamping a metallic sheet or by molding the material into the desired shape, for example.

As mentioned, the support posts of the stop bracket portion may support one or more interface brackets. These interface brackets may be any type of bracket or element to be attached to the column tube. The interface bracket may be a bracket for interfacing with one or more other elements or components of an assembly, such as an automobile assembly (e.g., a steering column assembly, wiring harness, column cover, and the like). For example, the interface bracket may be specified by a customer or by an automobile manufacturer. The interface bracket may be a wire harness bracket. The interface bracket may be attached in one or more locations to the stop bracket (e.g., one or more support posts). The interface bracket may attach to one or more bracket attachment portions of the stop bracket portion. For example, an interface bracket may be attached in two locations, on two of the four support posts of the stop bracket portion. The interface bracket may have one or more openings (e.g., punched holes) for receiving a fastener, such as a rivet, and attaching the interface bracket to the stop bracket portion (e.g., through the corresponding opening in the support bracket).

In general, the guidance and limiting unit subassembly is assembled by attaching the stop bracket portion to the column tube. The spacer portion is then installed, at least in part by inserting one or more support posts of the stop bracket portion through the associated support post openings of the spacer portion. The interface bracket may then be attached to one or more of the support posts of the stop bracket portion.

The present teachings include a method for reliably securing the stop bracket portion to the column tube. The securing of the stop bracket portion to the column tube may be achieved by any method that provides an attachment capable of withstanding the forces exerted upon the stop bracket portion, the column tube, or both, especially during adjustment of the steering column assembly. The stop bracket portion and column tube may be attached or joined together in a manner that is able to withstand a torque of about 50 Nm or more, about 75 Nm or more, or about 90 Nm or more (e.g., at least about 100 Nm). Possible methods include, but are not limited to, use of adhesives, welding, soldering, clips, pins, screws, rivets, or other mechanical fasteners. It is contemplated that the column tube may have one or more apertures that generally align with the attachment apertures of the stop bracket portion to allow for receiving a fastener to secure the stop bracket to the column tube. Therefore, one possible method includes attachment via one or more fasteners inserted through attachment apertures of the stop bracket portion and corresponding apertures in the column tube. Potential fasteners may include, but are not limited to, rivets (e.g., all steel rivets installed via break stem fasteners), screws, bolts, tree fasteners, snaps, pins, the like, or a combination thereof. Each area of attachment (e.g., each fastener) may be able to withstand a torque of about 50 Nm or more, about 75 Nm or more, or about 90 Nm or more (e.g., at least about 100 Nm). Therefore, for example, if the attachment of the stop bracket portion to the column tube includes three fasteners, and each fastener is able to withstand a torque of about 100 Nm, the assembly may be able to withstand a torque of about 300 Nm.

In one exemplary method, assembly of the guidance and limiting unit subassembly onto a column tube may be as follows. The column tube may be placed over a fixture or support, such as a support horn, to provide support and distribute forces applied during the installation and assembly of the guidance and limiting unit subassembly. The stop bracket portion may be positioned upon the outer surface of the column tube and the securing tab may be inserted into the associated opening in the column tube. The attachment apertures of the stop bracket portion may be aligned with the openings in the column tube for receiving the fastening means. A break stem fastener (e.g., made of steel), may be inserted into the openings in the stop bracket portion and the column tube, and the stem may be pulled, compressing the body of the rivet. The compression may continue until all joint clearance is removed, and a certain stress in the stem is achieved. The stem may then break away, leaving the rivet to secure the stop bracket portion and the column tube.

Upon attachment of the stop bracket portion to the column tube, the spacer may be installed (though it is possible that the spacer be installed prior to attachment of the stop bracket portion to the column tube). The support posts of the stop bracket portion may be held in a desired position (i.e., to align with the support post openings in the spacer portion) by one or more pins or other members that may prevent the support posts from splaying outwardly. The support post openings of the spacer portion may be aligned with the support posts and the spacer portion may be pressed onto the stop bracket portion so that the support posts extend into and/or through the support post openings. The spacer portion, as it is pressed onto the support posts, may contact the ribs of the support posts (which may cause the support openings to elastically deform to accommodate the ribs). The ribs may fit within the clearance of the spacer portion. The ribs may reduce slippage of the spacer portion, as the ribs may engage with and/or contact the walls of the spacer defining the rib clearance of the spacer portion. Upon the ribs passing through the support post openings of the spacer portion, the openings may return to their original shape, which may provide and interference fit and/or additional reduction of slippage, as the spacer may not be removed without deformation of the openings.

If the stop plate includes one or more beads (i.e., on a support post), the beads may push into the spacer portion, deforming the spacer and creating a compressive force. The bead (i.e., by pushing into the spacer portion) may force the opposing side of the support post against the wall defining the opening of the spacer portion. A pocket may be formed between the bead and the wall of the spacer portion defining the support post opening to allow the stamping burr of the support posts to exist without interference from the spacer portion. The pocket may be a nominal clearance between the support post and the wall defining the support post opening of about 0.05 mm or more, about 0.1 mm or more, or about 0.2 mm or more. The pocket may be a nominal clearance of about 0.5 mm or less, about 0.35 mm or less, or about 0.3 mm or less. The bead allows for the die roll to be on the outside edge of the stop plate portion, so that a rounded edge comes into contact with the support post opening instead of a burr edge. This also may allow for easier insertion of the support post into the support post opening of the spacer portion. The pins or other members holding the support posts in place may then be removed as the spacer portion maintains the support posts in proper position.

The present teachings also include a method for securing an interface bracket to the column tube (e.g., via attachment to the stop bracket portion which is secured to the column tube). Preferably, the stop bracket portion includes one or more support posts adapted to support an interface bracket. The support posts adapted to support an interface bracket may have a length that extends through the support post opening of the spacer portion and have a free end including a bracket attachment portion for attaching the interface bracket thereto. The support post may include one or more attachment apertures that align with one or more openings in the interface bracket, into which a fastener may be inserted, such as a rivet via a break stem fastener, clip, snap, pin, bolt, screw, and the like. Other methods of attachment are also possible, such as via adhesives, welding, soldering, crimping, brazing, and the like (in which case, one or more attachment apertures may not be necessary). It is contemplated that there may be a controlled clearance between the interface bracket and the spacer portion. The controlled clearance may be about 0.05 mm or more, about 0.1 mm or more, or about 0.3 mm or more. The controlled clearance may be about 1 mm or less, about 0.8 mm or less, or about 0.7 mm or less. For example, the clearance may be about 0.5 mm. If the fit of the spacer portion to the stop bracket portion loosens, the presence of the controlled clearance may limit the potential travel of the spacer portion.

When the steering column assembly is assembled and installed within a vehicle, the adjustment subassembly may allow for the steering column assembly to be adjusted to a desired position relative to the user (e.g., tilt adjustment, telescopic adjustment, or both). The adjustment may be actuated by a lever. The lever may include a handle portion that the user moves (e.g., upward and/or downwardly relative to the user, relative to the ceiling and floor of the vehicle, or both). The lever may be fixed to the adjustment subassembly (e.g., at an end of the elongated fastener, such as a tilt bolt) at a pivot point, where the handle portion is permitted to rotate about this pivot point. On the opposite side of the pivot point from the handle portion may be an arm that supports a hook or other projection. The hook or other projection may be supported by two arms joined at a bridge, where the hook extends from the bridge. One arm may extend from the pivot point of the lever, and the other arm may serve as an opposing securing portion that attaches to and/or rotates about the opposing side of the elongated fastener (such as a tilt bolt) within the adjustment subassembly. The hook or other projection may be adapted to fit within the slot of the tongue portion of the spacer portion, at least during part of the adjustment process.

Upon movement of the handle portion, the steering column assembly may be caused to be put in a locked position or in an unlocked position. For example, pushing the lever in a particular direction, such as downwards (e.g., toward the floor of the vehicle), may cause the column housing to become unclamped from the column tube, thereby permitting the user to adjust the position of the steering wheel by tilting, telescoping, or both. Forcing the lever in the opposite direction, such as upwards (e.g., toward the ceiling of the vehicle), may cause the walls of the column housing to engage and/or clamp the column tube. The clamping may secure the column tube and steering shaft, and therefore the steering wheel, in the present position. When the steering column assembly is, in a locked position (e.g., the column housing is in a clamped position to hold the column tube in a particular position), the hook of the lever may be positioned generally parallel with the tongue portion or generally follow the path around the bottom of the tongue portion. The hook, therefore, may be disengaged from the tongue portion of the spacer portion. When the steering column assembly is in an unlocked position, the hook may be received within the slot of the tongue portion.

When the steering column assembly is in a locked position, the hook of the lever may be disengaged from the tongue portion of the spacer portion in any telescopic position. Therefore, during an impact (e.g., when a user contacts the steering wheel during a vehicle collision), when the steering column assembly is in a locked position, an energy absorption module within the steering column assembly may serve to absorb energy during the inward telescoping of the column tube, steering shaft, or both.

When the steering column assembly is in an unlocked position, the hook of the lever may be received into the slot of the tongue portion of the spacer portion. The length of the slot may permit full normal telescope range while the steering column is in the unlocked position, thereby allowing a user to adjust the telescoped position of the steering wheel. The slot terminates at a contact portion, which serves as a stop to limit the inward telescoping (i.e., toward the forward end of the steering column assembly) upon reaching the maximum telescope-in distance. Therefore, during telescoping inwardly and upon reaching the maximum telescope-in distance, the hook may contact the contact portion, which provides a stop to prevent the user from further inward telescoping. The interaction between the hook and the contact portion may assist in relieving the energy absorption module from also being the telescoping short stop. This may also reduce the impacts from inward telescoping operations on other parts of the assembly. For the hook and the contact portion of the tongue portion to interact, it may be desirable to reduce the friction between the elements. Methods of reducing friction between the elements may include, but are not limited to, minimizing the contact area between the two elements (e.g., by providing a point or line of contact); greasing or lubricating the surface of either or both the tongue portion and the hook; modifying the shape of the surfaces (e.g., making one surface generally planar and one surface generally arcuate or curved), or a combination thereof. For example, the hook surface may be generally planar and the surface of the contact portion may be generally arcuate or curved, or vice versa.

The interaction between the hook and the contact portion of the spacer portion may also provide additional safety features, such as a self-locking feature. Upon a greater force exerted than normal telescoping adjustment operation forces, the hook contacting the contact portion may force the lever to be moved into the locked position, thereby also causing the column housing to clamp the column tube. For example, contact portion makes contact with the hook, the hook may slide along the arcuate surface of the contact portion, and the lever can rotate to allow the hook to pass out of the slot. The lever can be fully rotated into the lever locking direction. As the steering column assembly returns to a locked position, the energy absorption from clamping is reestablished. This may be an advantageous safety feature, for example, if a vehicle operator is traveling with the steering column assembly in an unlocked position and the vehicle is subsequently involved in a vehicle collision. In traditional steering column assemblies, the energy absorption may be compromised (e.g., because the steering column is not in a clamped position). However, as the column tube is forced inwardly (i.e., toward the forward end of the steering column assembly), the hook is forced to contact the contact portion acting as a telescoping stop, and as this force is greater than typical telescoping adjustment forces, the lever is forced to pivot and enter the locked position, causing the column housing to clamp onto the column tube and provide additional energy absorption.

Figure 2:
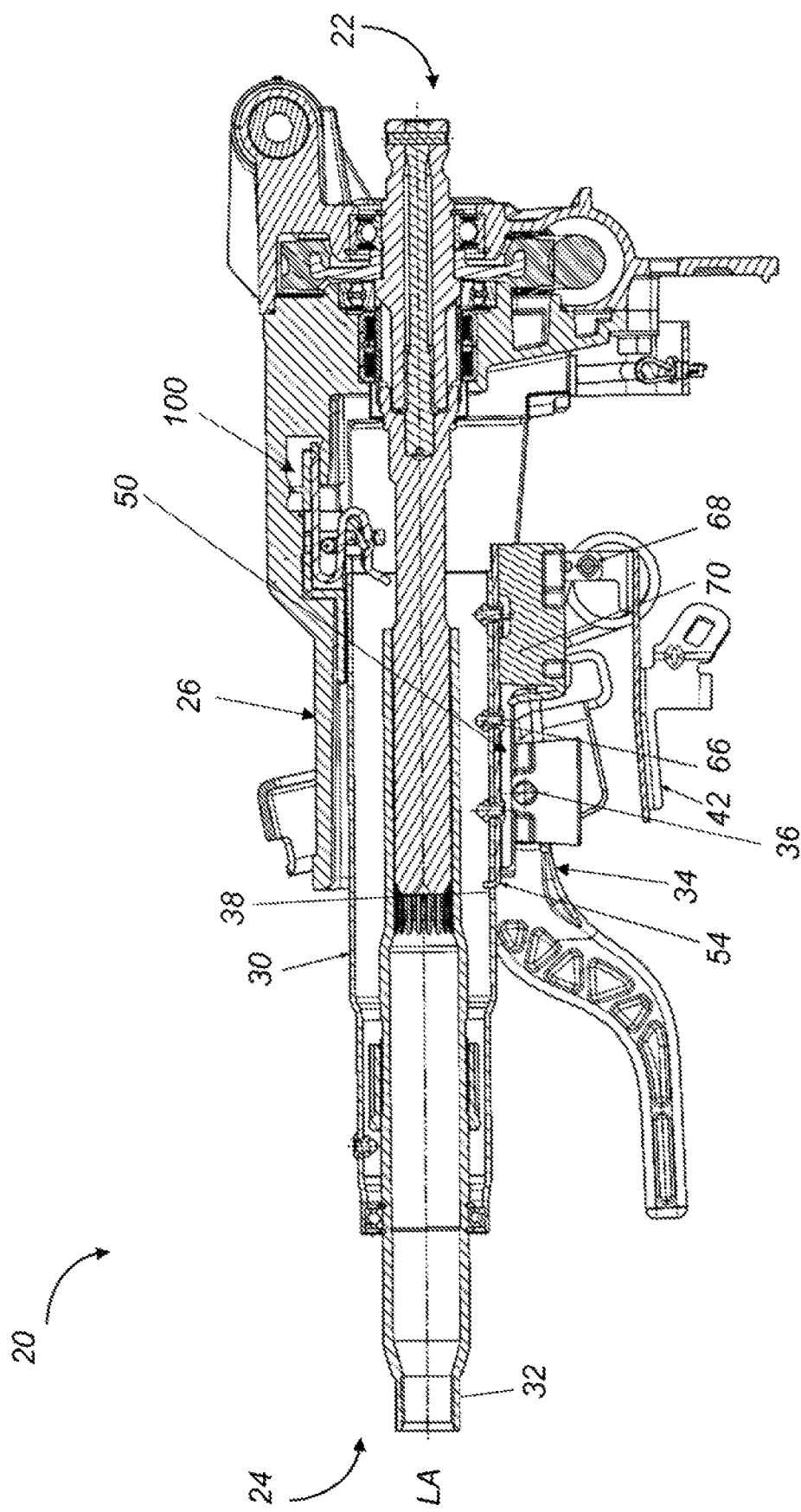
FIG. 2 is a cross-sectional side view of an illustrative steering column assembly in accordance with the present teachings.

Referring now to the figures, FIGS. 1 and 2 illustrate a steering column assembly 20 including a guidance and limiting unit subassembly 40 in accordance with the present teachings. The steering column assembly 20 has a forward end portion 22 and a rearward end portion 24. A column housing 26 at least partially supports a column tube 30, and the column tube 30 is at least partially disposed within the column housing 26. The steering column assembly 20 includes an energy absorption module 100 that absorbs energy as the column tube 30 is forced to telescope inwardly (i.e., toward the forward end portion 22) in the event of a collision or secondary impact (e.g., when a vehicle occupant contacts the steering wheel as a result of an impact such as a vehicle collision). The column tube 30 carries the guidance and limiting unit subassembly 40 that includes a stop bracket portion 50 (which supports an interface bracket 42) and a spacer portion 70. The steering column assembly 20 also includes an adjustment subassembly 34 for adjusting the position (e.g., via telescoping adjustment, tilt adjustment, or both) of a steering wheel (not shown) supported by a steering shaft 32 relative to a user. The position of the column tube 30 relative to the column housing 26 may be fixed by way of a securing member or elongated fastener 36 (e.g., a tilt bolt) that is located in a secure engagement position and applies a force (e.g., a generally transverse force relative to the longitudinal axes LA of the column housing 26 and column tube 30) to at least one of the column housing 26 or column tube 30 for causing a secure engagement of the column tube 30 and the column housing 26 (e.g., a clamped engagement, an interference, interlock, detent or other mechanical engagement). The guidance and limiting unit subassembly 40 is located within an axial slot 28 of the column housing 26, and the guidance and limiting unit subassembly 40 maintains the position of the column tube 30 within the steering column assembly 20 (e.g., via one or more of the side wall portions 60 of the stop bracket portion 50, the securing tab 54 of the stop bracket portion 50 received within the opening 38 in the column tube 30, one or more wing dampers 76 of the spacer portion 70, one or more resilient tabs 74 of the spacer portion 70, the elongated fastener 36 (e.g., a tilt bolt) or combination thereof, as shown in more detail in the other figures).

FIG. 2 is a cross-sectional side view of the steering column assembly 20 taken along the longitudinal axis LA. The stop bracket portion 50 is supported by and attached to the column tube 30 at a column tube attachment portion 66 (e.g., via rivet attachment). The stop bracket portion 50 also includes a securing tab 54 which extends into and engages with a column tube opening 38 to further secure the stop bracket portion 50 relative to the column tube 30. The stop bracket portion 50 supports and engages with the spacer portion 70 via the support posts 56 (see FIG. 4). An interface bracket 42 is supported by and attached to the support posts at a bracket attachment portion 68 (e.g., via rivet attachment).

Figure 3:
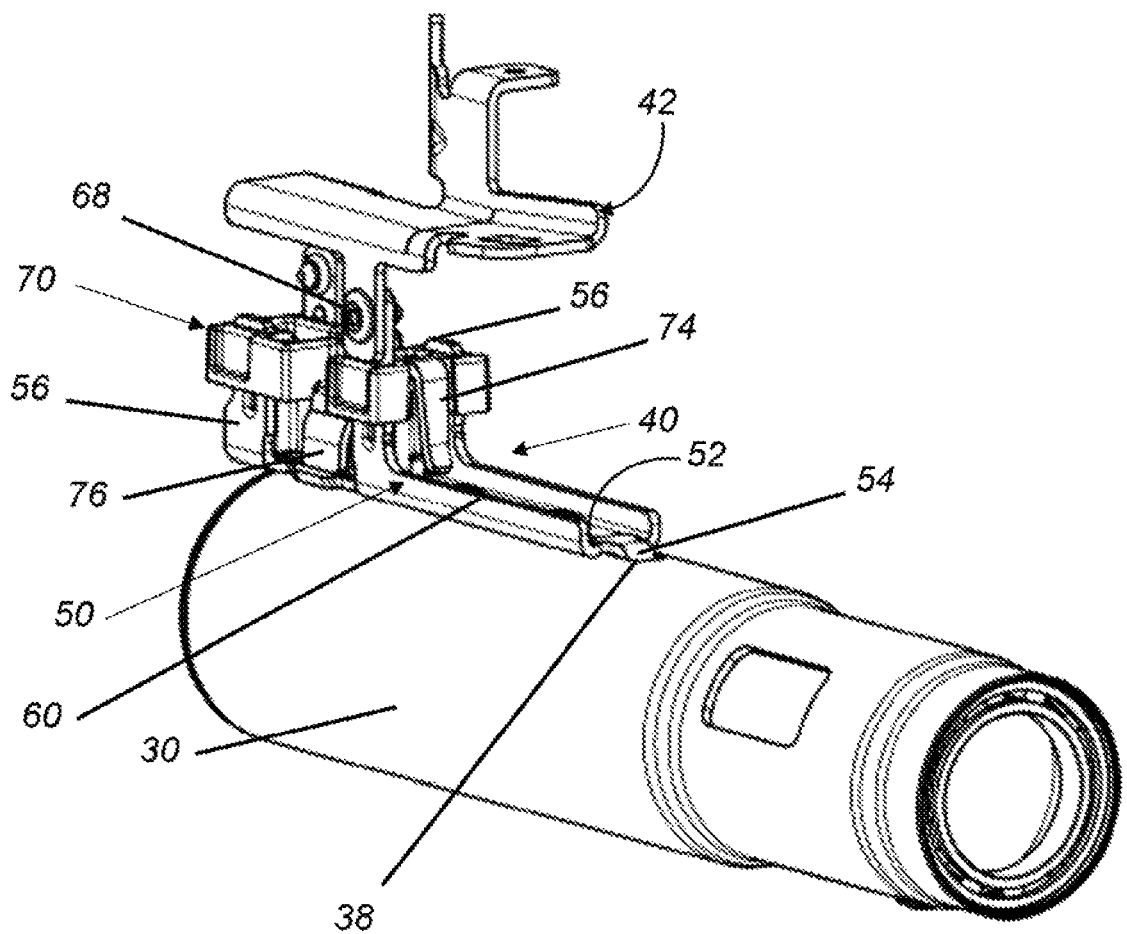
FIG. 3 is a perspective view of an illustrative column tube, stop bracket portion, and spacer portion in accordance with the present teachings.

FIG. 3 is a perspective view of a guidance and limiting unit subassembly 40 coupled with a column tube 30. The guidance and limiting unit subassembly 40 includes a stop bracket portion 50 supporting a spacer portion 70. The stop bracket portion 50 includes a securing tab 54 at one end that engages with the column tube 30 by extending into the column tube opening 38. On the generally opposing side, the stop bracket portion 50 includes a plurality of support posts 56 extending from the body portion 52 of the stop bracket portion 50. Between the ends of the stop bracket portion 50 are a pair of generally opposing side wall portions 60, which serve to locate the column tube within the axial slot of the column housing (see FIG. 1). The guidance and limiting unit subassembly 40 functions to support an interface bracket 42, such as one specified by a customer (e.g., an automobile manufacturer). The interface bracket 42 is coupled to one or more of the support posts 56 of the stop bracket portion 50 at one or more bracket attachment portions 68 (e.g., via rivet attachment). The support posts 56 also support a spacer portion 70. The spacer portion 70 includes damping elements to absorb energy and/or maintain the alignment and positioning of the column tube 30 within the steering column assembly 20 (see FIGS. 1 and 2). The damping elements may include one or more wing dampers 76 and one or more resilient tabs 74 (e.g., located at the forward end, rearward end, or both, of the spacer portion 70). The figures herein generally illustrate two wing dampers 76, one on each side of the spacer portion 70, and a rearward-facing resilient tab 74, though forward resilient tabs (or other directional tabs or wings) are also contemplated.

Figure 4:
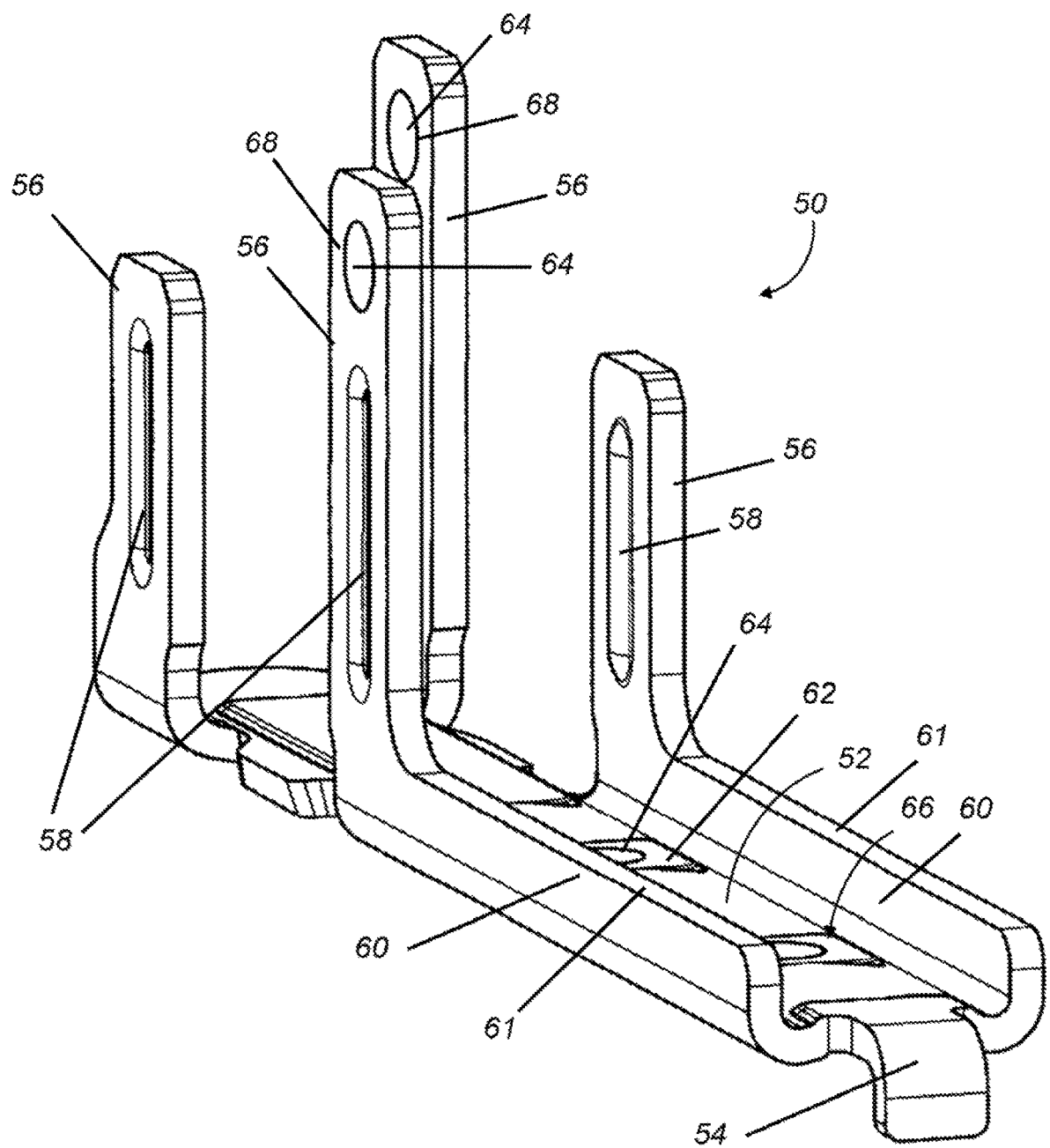
FIG. 4 is a perspective view of an illustrative stop bracket portion in accordance with the present teachings.

FIG. 4 illustrates an exemplary stop bracket portion 50. The stop bracket portion 50 includes a body portion 52 that is oriented generally parallel to the longitudinal axis LA of the column tube 30 when installed in the steering column assembly 20 (see FIG. 2). The body portion may be shaped so that it generally matches the shape of the column tube upon which is it positioned (e.g., having a slight curvature). The stop bracket portion 50 includes a pair of generally opposing side wall portions 60 which assist in locating the stop bracket portion 50 (and the guidance and limiting unit subassembly 40) within the steering column assembly (e.g., within the axial slot 28 of the column housing 26). The top 61 of the side wall portions 60 serve as a rail for the tilt bolt 36 (see FIG. 8), and there is minimal clearance between the top 61 and the tilt bolt 36. The body portion 52 includes a column tube attachment portion 66 located between the generally opposing side wall portions 60 and/or between opposing support posts 56. When fasteners are used such as rivets, screws, or other fasteners, the column tube attachment portion 66 includes a plurality of attachment apertures 64 for receiving a fastening and attaching the stop bracket portion 50 to the column tube 30. Surrounding each of the attachment apertures 64 is an embossment 62, which forms a generally flat surface to provide stability to the attachment.

Extending from one end of the stop bracket portion 50 is a securing tab 54, which engages with the column tube 30 to provide further securing of the guidance and limiting unit subassembly 40 to the column tube 30 (see FIG. 2). The stop bracket portion 50 also includes a plurality of support posts 56 extending generally upwardly from the body portion 52 (e.g., generally forming an angle between about 75 degrees and about 105 degrees between a support post 56 and the body portion 52). One or more of the support posts 56 may be connected to and/or extend from a side wall portion 60. Each support post 56 includes a rib 58 (though it is also contemplated that that any or all posts may not include a rib) that extends inwardly for assisting in securing the spacer portion 70 on the support posts 56 (see FIG. 3). Some (e.g., two as shown in the figure) of the support posts 56 may include a bracket attachment portion 68 that provides an area for the interface bracket 42 to be secured. If the interface bracket 42 is secured to the support post 56 via a fastener (e.g. a rivet, screw, or other fastener), there may be an attachment aperture 64 on one or more of the support posts 56.

Figure 5A:
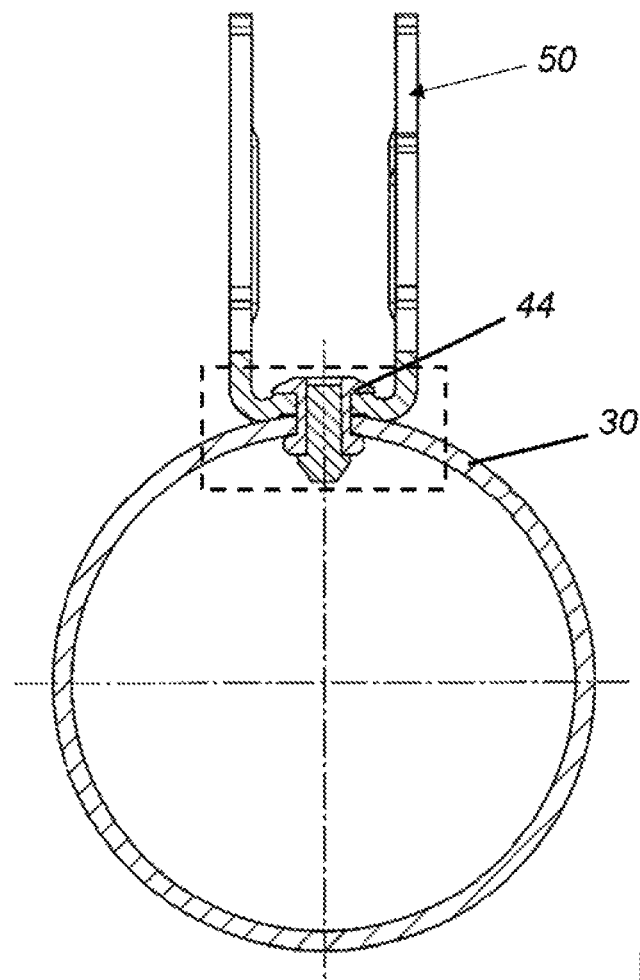
FIG. 5A is a cross-sectional view of exemplary column tube with a stop bracket portion attached thereto.
Figure 5B:
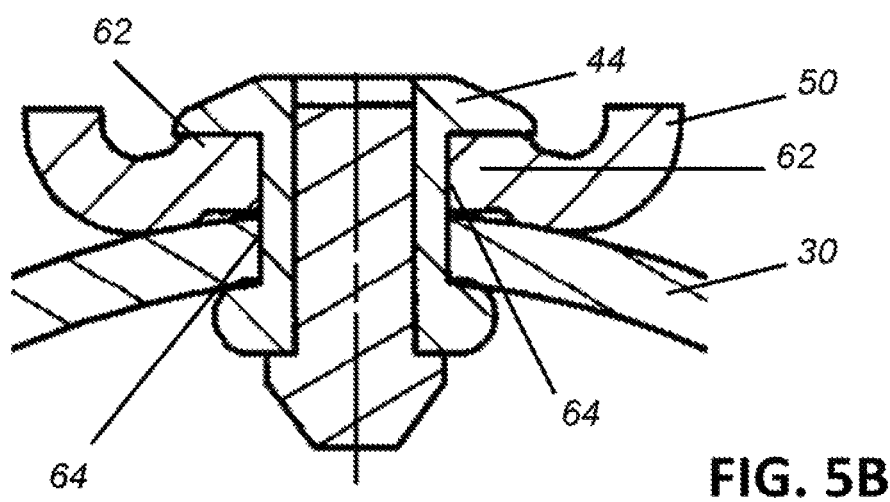
FIG. 5B is an enlarged view of the attachment of the stop bracket portion to the column tube of FIG. 5A.
Figure 6A:
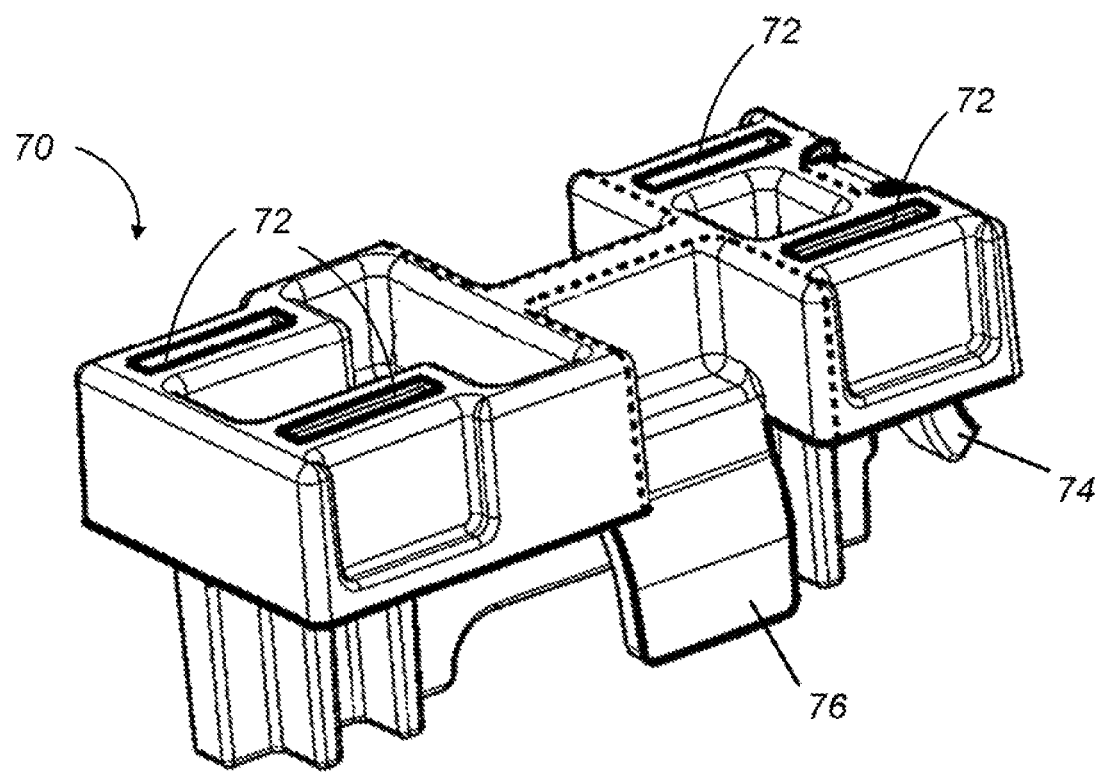
FIG. 6A is a perspective view of an illustrative spacer portion in accordance with the present teachings.
Figure 6B:
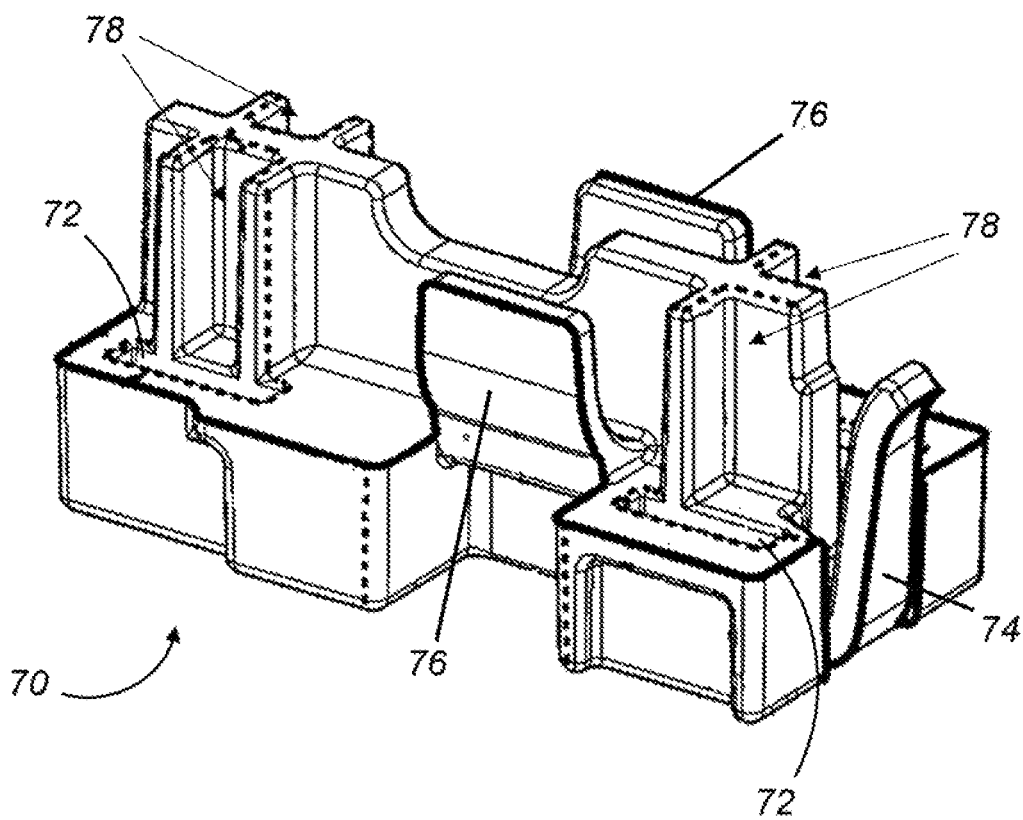
FIG. 6B is a perspective view of the opposing side of the illustrative spacer portion of FIG. 6A.

FIGS. 5A and 5B illustrate a cross-sectional view of a column tube 30 and a stop bracket portion 50 to show an exemplary method of attachment. It is contemplated that one or more fasteners 44, such as a break stem fastener, can secure the stop bracket portion 50 to the column tube 30. FIG. 5B is an enlarged view of the attachment of FIG. 5A (e.g., the area within the dotted box of FIG. 5A). The stop bracket portion has an attachment aperture 64 (and the column tube 30 has a corresponding aperture) for receiving the fastener 44 (e.g., break stem fastener). The embossment 62 of the stop bracket portion 50 provides a generally flat surface for the head of the fastener 44 (e.g., break stem fastener) to engage with. The generally flat surface of the embossment 62 provides additional security to reduce the likelihood of the fastener 44 loosening or reduce the likelihood of movement (e.g., rotation or side-to-side rocking) of the stop bracket portion 50 on the curved column tube 30.

Figure 7A:
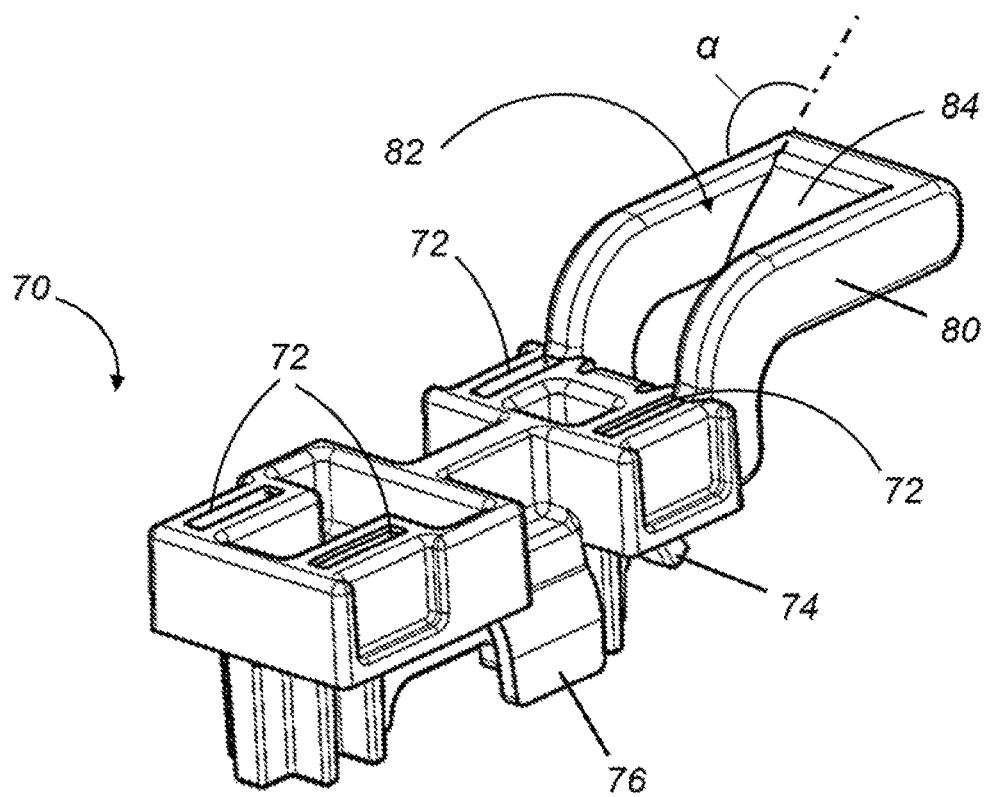
FIG. 7A is a perspective view of an illustrative spacer portion in accordance with the present teachings.
Figure 7B:
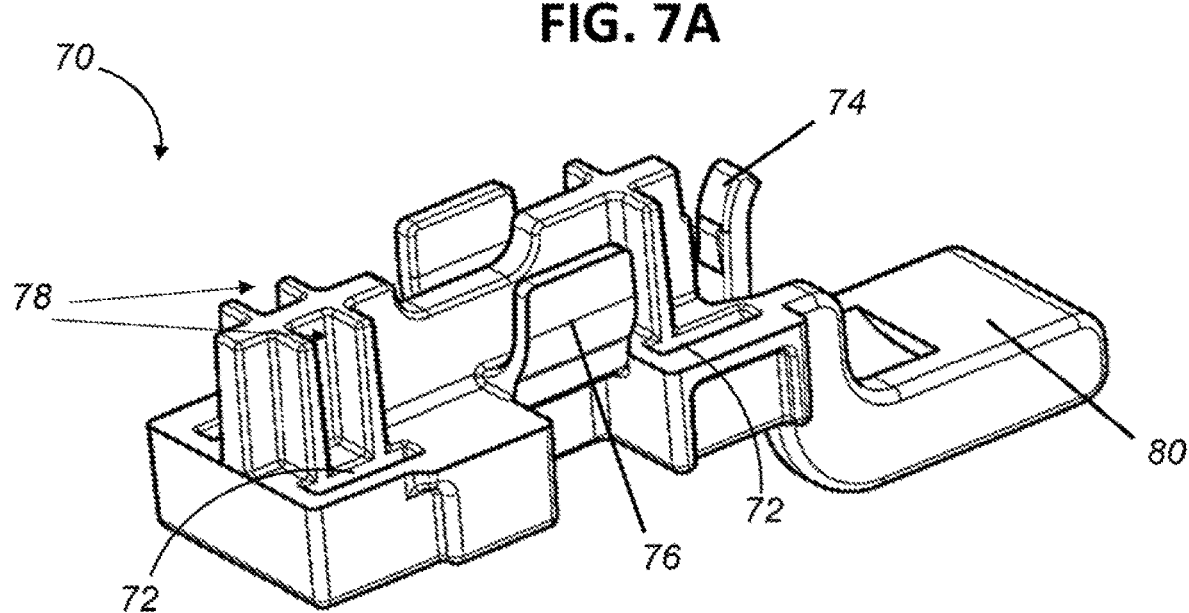
FIG. 7B is a perspective view of the opposing side of the illustrative spacer portion of FIG. 7A.

FIGS. 6A, 6B, 7A and 7B illustrate an exemplary spacer portion 70. The spacer portion 70 includes a plurality of support post openings 72 for receiving the support posts 56 of the stop bracket portion 50 (see FIG. 4). The spacer portion 70 also includes a rib clearance 78 for receiving and engaging with the ribs 58 of the support posts 56 (see FIG. 4) to provide additional stability of the spacer portion 70 upon the stop bracket portion 50. The spacer portion 70 includes damping elements to absorb energy or secure the guidance and limiting unit subassembly within the steering column assembly. The damping elements include a resilient tab 74 and one or more wing dampers 76, shown in more detail in FIGS. 8 and 9. FIGS. 7A and 7B also illustrate a tongue portion 80 extending from an end of the spacer portion 70. The tongue portion 80 is generally curved and includes a slot 82, which is adapted to receive a hook 94 of a lever 90 (see FIGS. 10A-12B). At the distal end of the tongue portion 80 (e.g., where the slot 82 terminates) is a contact portion 84 which acts as a telescope-in stop upon contact with the hook 94 of the lever 90 when the column tube 30, steering shaft 32, or both, are telescoped inwardly toward the forward end portion 22 of the steering column assembly 20 (see FIG. 1). A plane extending parallel to the face of the contact portion 84 forms an angle α with a plane extending across a wall defining the slot 82.

Figure 8:
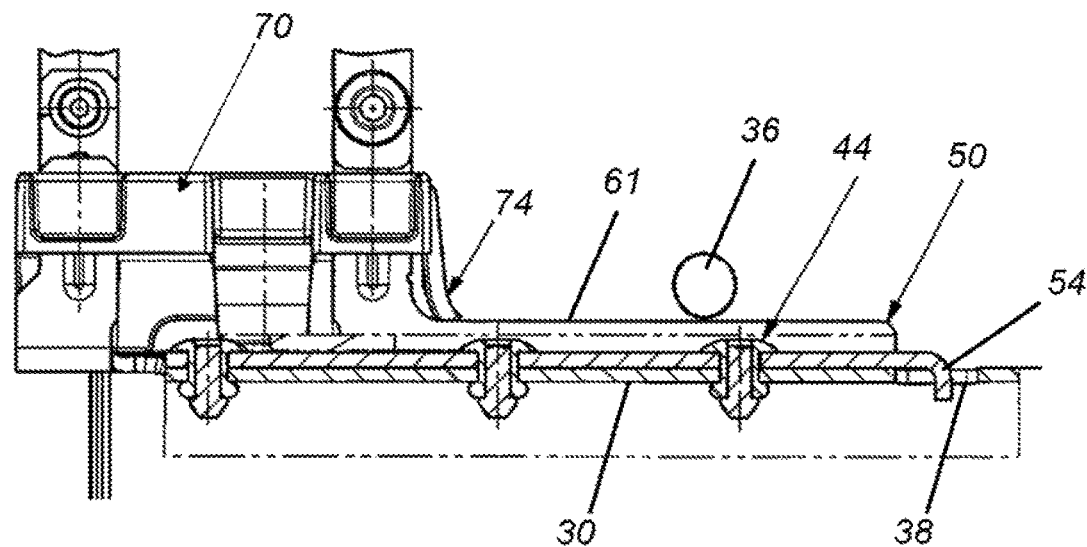
FIG. 8 is a side view of an exemplary stop bracket portion and spacer portion attached to a column tube.

FIG. 8 illustrates a spacer portion 70 having resilient tab 74, which faces rearward and serves as a compression element. The resilient tab 74 may deflect when the elongated fastener 36 (e.g., a tilt bolt) comes into contact with the resilient tab 74 during adjustment of the steering column assembly, such as during telescoping adjustment. The resilient tab 74 reduces or prevents metal-to-metal contact, such as contact between the elongated fastener 36 (e.g., the tilt bolt) and the stop bracket portion 50. The stop bracket portion 50 is secured to the column tube 30 by a plurality of fasteners 44 (e.g., break stem fasteners) and is further secured by the securing tab 54 engaging with the column tube 30 via the column tube opening 38. There is minimal clearance (e.g., about 2 mm or less, about 1 mm or less, or about 0.5 mm or less) between the top 61 of the side wall portions and the elongated fastener 36 (e.g., tilt bolt). With the stop bracket portion 50 being generally sandwiched between the column tube 30 and the tilt bolt 36, the stop bracket portion is held in place, even if the fasteners 44 were to fail (e.g., loosen, break, or through improper installation). This also helps to maintain the position of the securing tab 54 within the column tube opening 38.

Figure 9:
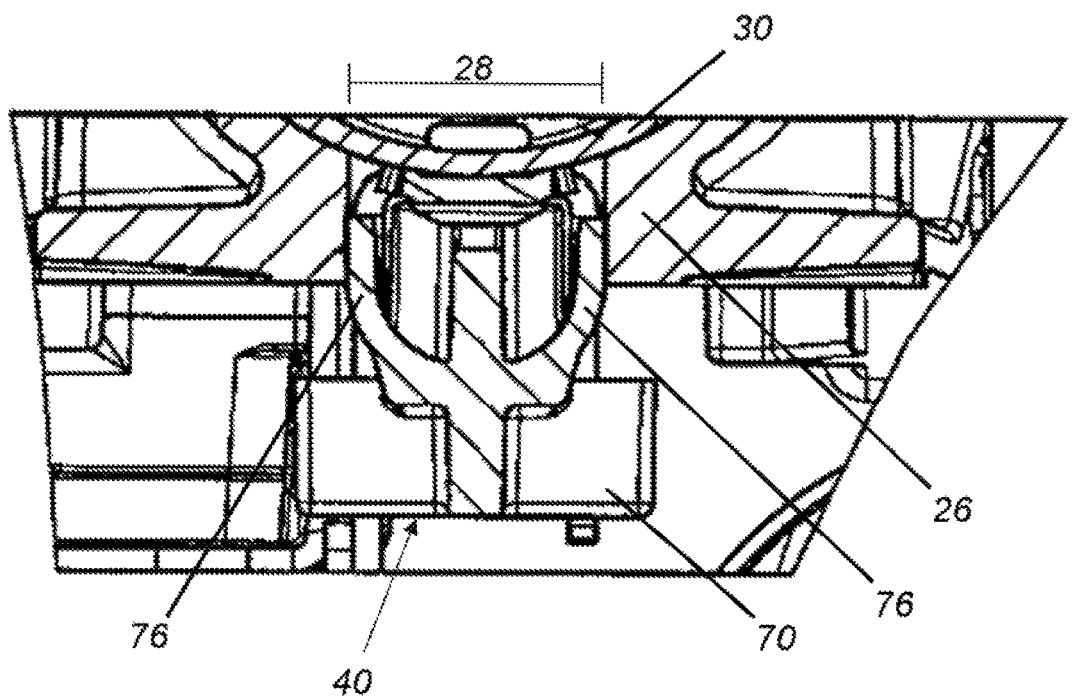
FIG. 9 is a cross-sectional view of a spacer portion within an axial slot of a steering column assembly.

FIG. 9 illustrates a cross-sectional view of an exemplary spacer portion 70 having two opposing wing dampers 76 on the sides of the spacer portion 70. The wing dampers 76 are employed within the axial slot 28 of the column housing 26 and function to dampen noise and avoid metal-to-metal contact between the column housing 26 and other elements of the assembly, such as the column tube 30 and/or the stop bracket portion. The wing dampers 76 also serve to reduce rotation of the column tube 30 and/or the guidance and limiting unit subassembly 40, especially during adjustment of the assembly (e.g., telescoping adjustment, tilt adjustment, or both).

Figure 10A:
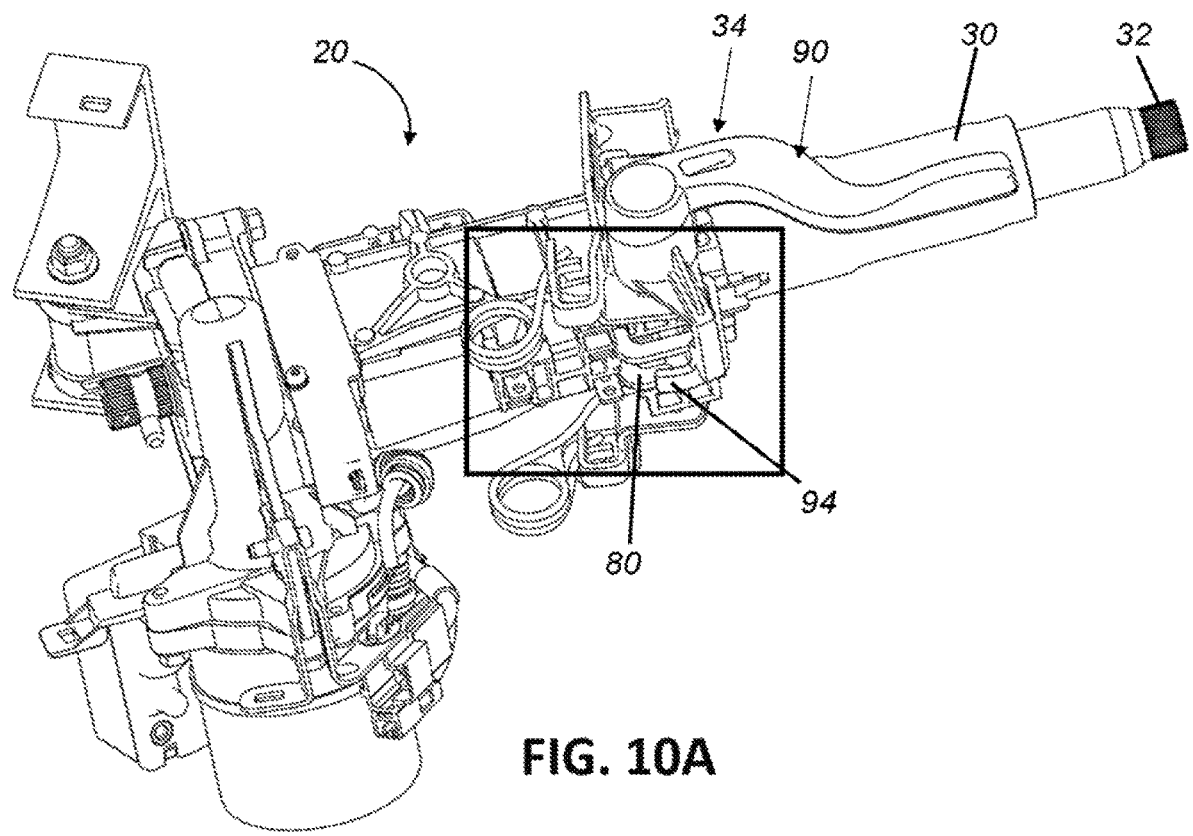
FIG. 10A is a generally bottom view of an illustrative steering column assembly in a locked position in accordance with the present teachings.
Figure 10B:
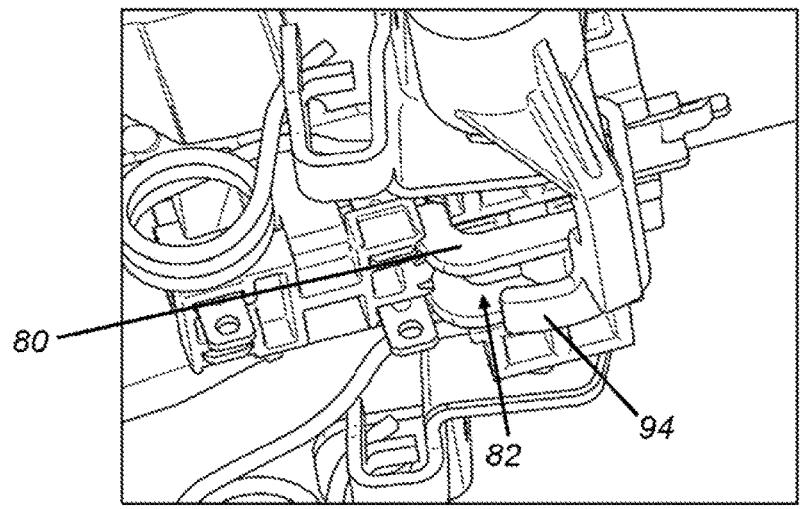
FIG. 10B is an enlarged view of the boxed portion of FIG. 10A.

FIGS. 10A and 10B illustrate a steering column assembly 20 with the adjustment subassembly 34 in a locked position (e.g., clamped) so the column tube 30 and steering shaft 32 are held in the desired position (e.g., desired tilt position, desired telescoped position, or both). The adjustment subassembly 34 is controlled via a lever 90. FIG. 10B is an enlarged view of the portion within the box of FIG. 10A, illustrating the hook 94 of the lever in relation to the tongue portion 80 of the spacer portion 70. The hook 94 is arranged so that it is able to be received within the slot 82 of the tongue portion 80.

Figure 11A:
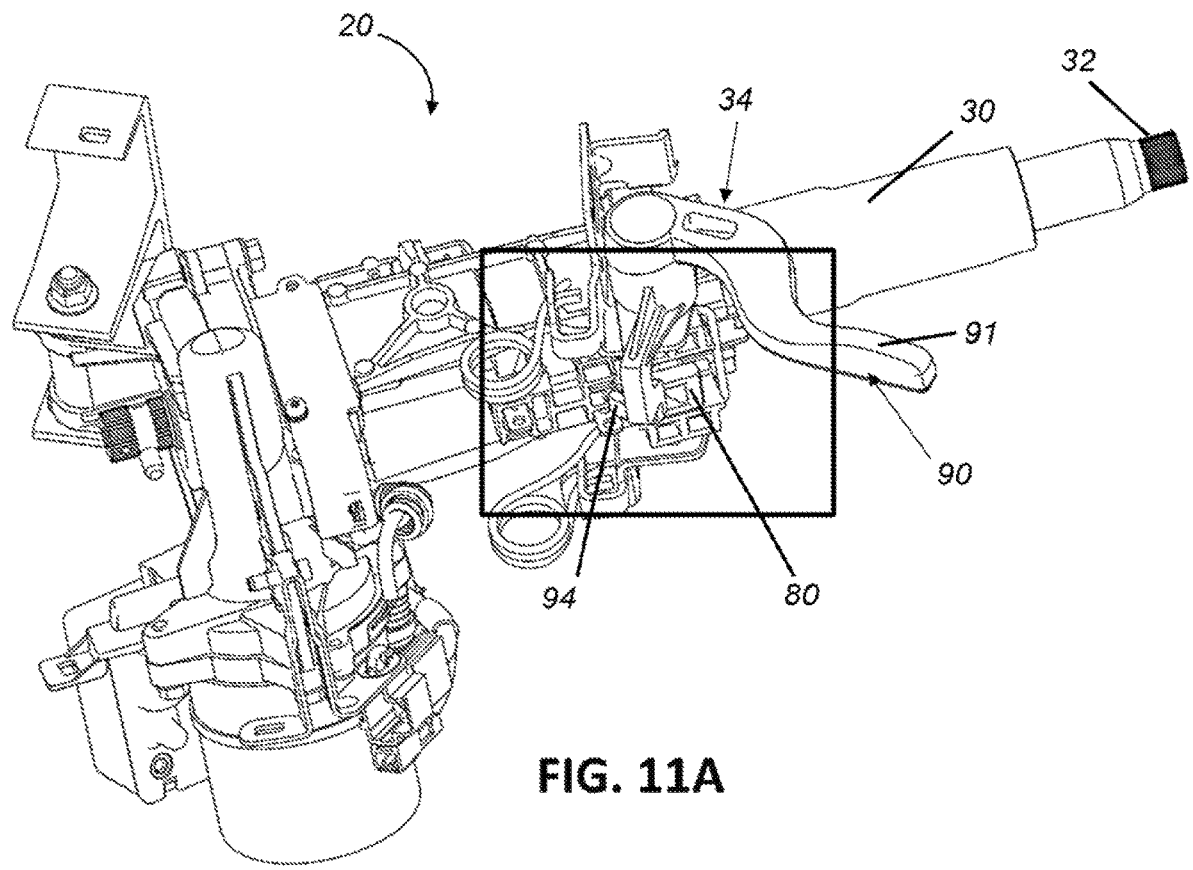
FIG. 11A is a generally bottom view of an illustrative steering column assembly in an unlocked position in accordance with the present teachings.
Figure 11B:
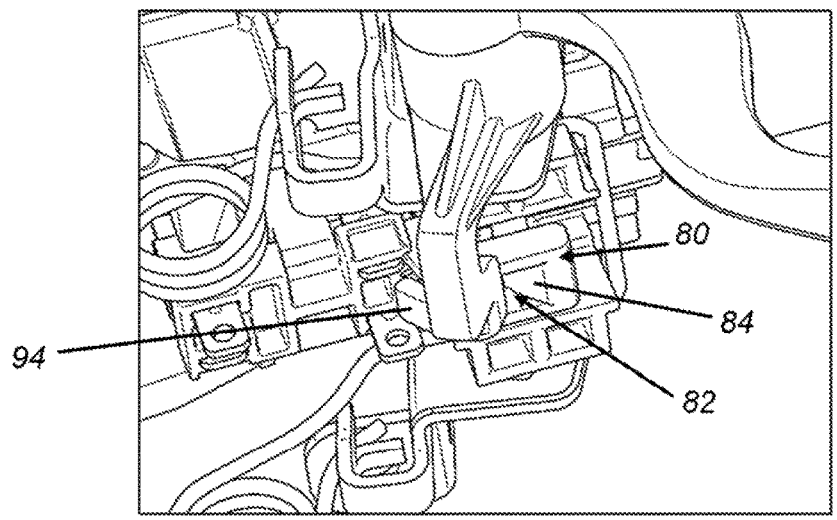
FIG. 11B is an enlarged view of the boxed portion of FIG. 11A.

FIGS. 11A and 11B illustrate the steering column assembly 20 of FIGS. 10A and 10B, where the adjustment subassembly 34 is in an unlocked position so the column tube 30 and/or steering shaft 32 can be adjusted (e.g., by tilting, telescoping, or both). When the handle portion 91 of the lever 90 is pushed generally downwardly, the hook 94 is received into the slot 82 of the tongue portion 80. When the column tube 30 and/or steering shaft 32 are telescoped inwardly (i.e., toward the forward end portion of the steering column assembly), telescoping will stop as the hook 94 contacts the contact portion 84 of the tongue portion 80.

Figure 12A:
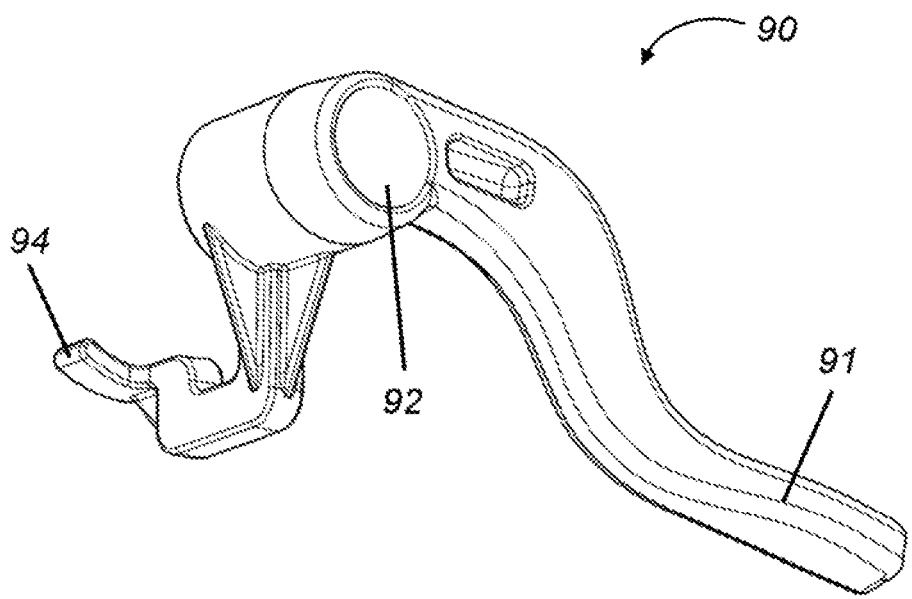
FIGS. 12A and 12B are illustrative levers of an adjustment subassembly in accordance with the present teachings.
Figure 12B:
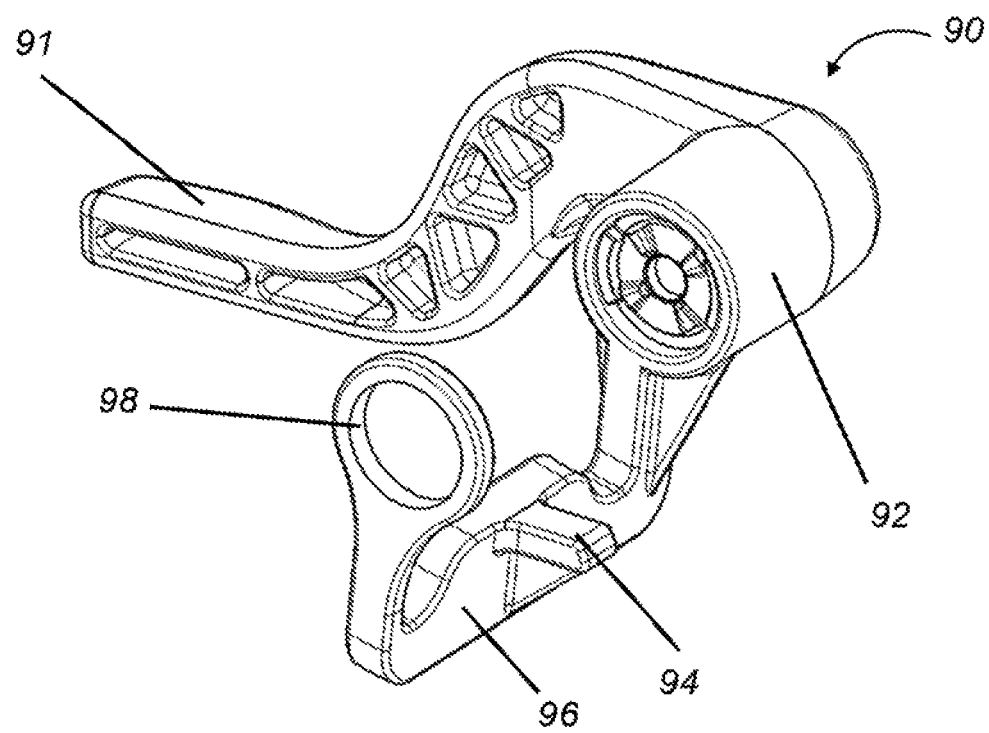

FIGS. 12A and 12B are illustrative levers 90 of an adjustment assembly for actuating adjustment of the tilt, telescoping, or both, of the column tube and/or the steering shaft of the steering column assembly. The levers 90 include a handle portion 91 at the distal end. The lever 90 includes a pivot portion 92 where the lever 90 is attached within the assembly (e.g., to an end of an elongated member such as a tilt bolt) and is able to pivot. The lever 90 may include a hook 94 for being received within a slot 82 of the tongue portion 80 of the spacer portion 70 (see FIGS. 11A and 11B). As shown in FIG. 12B, the lever 90 may include a bridge 96, from which the hook 94 extends, that joins the pivot portion 92 to an opposing securing portion 98. The opposing securing portion 98 can be attached within the steering column assembly, for example, at the opposite end of the elongated member (such as a tilt bolt).

While exemplary embodiments are described above, it is not intended that these embodiments describe all possible forms of the teachings. Rather, the words used in the specification are words of description rather than limitation, and it is understood that various changes may be made without departing from the spirit and scope of the invention. Additionally, the features of various implementing embodiments may be combined to form further embodiments of the invention. For example, it is contemplated that there may be fewer than four support posts (e.g., two or three), or more than four support posts on the stop bracket portion. The spacer portion may have additional damping elements. The spacer portion may only have one damping element (e.g., a resilient tab or one or more wing dampers) or no damping elements. The spacer portion and stop bracket portions may be made of an integral piece of material. The spacer portion and stop bracket portion may be constructed of the same materials or different materials. The methods of attachment of the stop bracket portion to the column tube and/or to the interface bracket may vary depending on the application, the forces exerted upon it, the amount of space within the assembly, or any combination thereof. Assembly of the guidance and limiting unit subassembly (e.g., one piece to another piece, the subassembly to the column tube, or both) may include welding, bonding, fastening, or any combination. Multiple pieces may be combined or attached to form the stop bracket portion. Multiple pieces can be combined or attached to form the spacer portion. Alternatively, the stop bracket portion and spacer portion can be formed from a single piece. The stop bracket portion, spacer portion, or both, may be integrally formed with the column tube. It is also contemplated that the subassembly may be free of other traditional elements of a steering column assembly. For example, the subassembly may be free of a nut bracket. The subassembly may be free of a stopper pin. The subassembly may be free of a slot liner.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, ail ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

What is claimed is:

1. An adjustable steering column assembly, comprising:
   I. a column tube;
   II. a column housing; and
   III. a device comprising:
      a. a spacer portion adapted to:
         i. provide rotational damping;
         ii. provide damping during adjustment of the steering column assembly;
         iii. assist in centering the column tube when in an unlocked position and assist in resisting lash;
      b. a stop bracket portion adapted to:
         i. limit rotational travel of the column tube when in the unlocked position;
         ii. retain the column tube longitudinally within the steering column assembly;
         wherein the stop bracket portion includes one or more support posts for matingly receiving the spacer portion by the way of through openings in the spacer portion.

2. The assembly of claim 1, wherein the spacer portion includes a resilient portion that is configured to at least partially fit within an axial slot of the column housing of the steering column assembly.

3. The assembly of claim 2, wherein the resilient portion of the spacer portion is defined by at least one wing damper.

4. The assembly of claim 1, wherein at least a portion of the spacer portion is in substantial compliance with the column housing of the steering column assembly.

5. The assembly of claim 1, wherein at least part of the spacer portion substantially retains a state of contact with a wall defining an axial slot of the column housing.

6. The assembly of claim 5, wherein lash between at least part of the spacer portion and the column housing is about 0.1 mm or less.

7. The assembly of claim 1, wherein the damping during adjustment of the steering column assembly is performed by a forward facing or rearward facing resilient tab of the spacer portion during telescope adjustment of the steering column assembly.

8. The assembly of claim 1, wherein the spacer portion includes a rearward facing tongue portion extending therefrom, and wherein the tongue portion includes a slot adapted for receiving at least a portion of the steering column assembly during telescope adjustment of the steering column assembly, and wherein the slot terminates at one end at a contact portion of the tongue portion.

9. The assembly of claim 8, further comprising an adjustment subassembly for permitting adjustment of the steering column assembly, and wherein the adjustment subassembly includes a lever for putting the column tube in the unlocked position and actuating the adjustment.

10. The assembly of claim 9, wherein the lever includes a hook extending therefrom adapted to be received within the slot of the tongue portion.

11. The assembly of claim 10, wherein the hook contacts the contact portion during telescope-in adjustment of the steering column assembly to stop the column tube from telescoping further in a forward direction.

12. The assembly of claim 10, wherein the lever includes a first arm and a second arm joined by a bridge,
   a. wherein the first arm extends from a pivot point of the lever, the pivot point formed by a connection between an elongated fastener of the adjustment subassembly and the lever; and
   b. wherein the second arm is an opposing securing portion that attaches to and/or rotates about an opposing end of the elongated fastener; and
   c. wherein the hook is supported by and extends from the bridge.

13. The assembly of claim 1, wherein the stop bracket portion includes a bracket attachment portion for matingly engaging at least a portion of the column tube.

14. The assembly of claim 1, wherein the stop bracket portion includes a plurality of attachment apertures for receiving a fastener to secure the stop bracket portion to the column tube.

15. The assembly of claim 14, wherein each of the attachment apertures receives a rivet for securing the stop bracket portion to the column tube.

16. The assembly of claim 15, wherein the stop bracket portion includes substantially flat surfaces surrounding one or more of the attachment apertures for contacting heads of the rivets.

17. The assembly of claim 1, wherein the stop bracket portion includes a pair of opposing side wall portions adapted to fit within an axial slot of the column housing and guide longitudinal adjustment of the column tube.

18. The assembly of claim 1, wherein the stop bracket portion includes a surface adapted to be in parallel line contact with the column tube to resist rocking when loaded in torsion.

19. The assembly of claim 1, wherein the stop bracket portion includes a securing tab adapted for resisting removal of the stop bracket portion and spacer portion from the column tube by penetrating an opening in the column tube.

20. An adjustable steering column assembly, comprising:
   I. a column tube;
   II. a column housing;
   III. a lever for putting the column tube in an unlocked position and actuating adjustment;
      wherein the lever includes a first arm and a second arm joined by a bridge;
      wherein the first arm extends from a pivot point of the lever, the pivot point formed by a connection between an elongated fastener and the lever;
      wherein the second arm is an opposing securing portion that attaches to and/or rotates about an opposing end of the elongated fastener; and
      wherein a hook is supported by and extends from the bridge;
   IV. a device comprising:
      a. a spacer portion adapted to:
         i. provide rotational damping;
         ii. provide damping during the adjustment of the steering column assembly;
         iii. assist in centering the column tube when in the unlocked position and assist in resisting lash;
      b. a stop bracket portion adapted to:
         i. limit rotational travel of the column tube when in the unlocked position;
         ii. retain the column tube longitudinally within the steering column assembly;
      wherein the spacer portion includes a rearward facing tongue portion extending therefrom;
      wherein the tongue portion includes a slot adapted for receiving the hook of the lever during telescope adjustment of the steering column assembly; and
      wherein the slot terminates at one end at a contact portion of the tongue portion.

* * * * *